(12) United States Patent
Sugimoto et al.

(10) Patent No.: US 10,770,905 B2
(45) Date of Patent: Sep. 8, 2020

(54) COMBINED POWER GENERATION SYSTEM

(71) Applicant: KAWASAKI JUKOGYO KABUSHIKI KAISHA, Kobe-shi, Hyogo (JP)

(72) Inventors: Kazushige Sugimoto, Amagasaki (JP); Kenichi Sakimoto, Akashi (JP); Tomoyuki Hirai, Osaka (JP); Shogo Hamano, Osaka (JP); Shimpei Kobayashi, Osaka (JP); Yuko Hirase, Kobe (JP); Kensho Abe, Kobe (JP); Osamu Noro, Akashi (JP); Shogo Katsura, Akashi (JP); Eiji Yoshimura, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/474,725

(22) PCT Filed: Dec. 27, 2017

(86) PCT No.: PCT/JP2017/047052
§ 371 (c)(1),
(2) Date: Jun. 28, 2019

(87) PCT Pub. No.: WO2018/124221
PCT Pub. Date: Jul. 5, 2018

(65) Prior Publication Data
US 2019/0334352 A1    Oct. 31, 2019

(30) Foreign Application Priority Data

Dec. 28, 2016   (JP) .................................. 2016-255062

(51) Int. Cl.
 H02J 3/46     (2006.01)
 H02J 3/32     (2006.01)
 H02J 3/38     (2006.01)

(52) U.S. Cl.
 CPC .................. *H02J 3/46* (2013.01); *H02J 3/32* (2013.01); *H02J 3/383* (2013.01); *H02J 3/387* (2013.01)

(58) Field of Classification Search
 CPC ............... H02J 3/00; H02M 1/00; H02M 7/00
 See application file for complete search history.

(56) References Cited

U.S. PATENT DOCUMENTS 6,051,941 A * 4/2000 Sudhoff .................. B60L 50/10
                                                    318/140
6,388,416 B1 * 5/2002 Nakatani ................. H02P 6/085
                                                    318/700

(Continued)

FOREIGN PATENT DOCUMENTS

WO    2013/008413 A1    1/2013

*Primary Examiner* — Rexford N Barnie
*Assistant Examiner* — Joseph N Inge
(74) *Attorney, Agent, or Firm* — Oliff PLC

(57) ABSTRACT

While a power storage installation operates as a virtual generator to maintain an power storage amount, a power generating installation calculates a first generated power change rate command value from a deviation between a frequency of a power distribution system and a frequency command value, calculates a second generated power change rate command value from received power measured by a received power measurer, calculates a second active power command value by integrating a generated power change rate command value to which the first generated power change rate command value and the second generated power change rate command value are added, and controls an output of the power generating installation based on the second active power command value.

10 Claims, 11 Drawing Sheets

(56) References Cited

U.S. PATENT DOCUMENTS

| | | | | |
|---|---|---|---|---|
| 6,528,966 | B2* | 3/2003 | Na | H02P 21/00 |
| | | | | 318/609 |
| 2003/0052640 | A1* | 3/2003 | Iwaji | H02P 6/21 |
| | | | | 318/700 |
| 2004/0189243 | A1* | 9/2004 | Tobari | H02P 21/06 |
| | | | | 318/807 |
| 2014/0152110 | A1* | 6/2014 | Sugimoto | H02J 4/00 |
| | | | | 307/66 |
| 2015/0357820 | A1* | 12/2015 | Sugimoto | H02M 7/44 |
| | | | | 307/52 |
| 2016/0006338 | A1* | 1/2016 | Sakimoto | H02P 21/0017 |
| | | | | 363/131 |
| 2018/0362181 | A1* | 12/2018 | Iwashima | H02M 7/12 |
| 2019/0097428 | A1* | 3/2019 | Goi | H02P 9/48 |

* cited by examiner

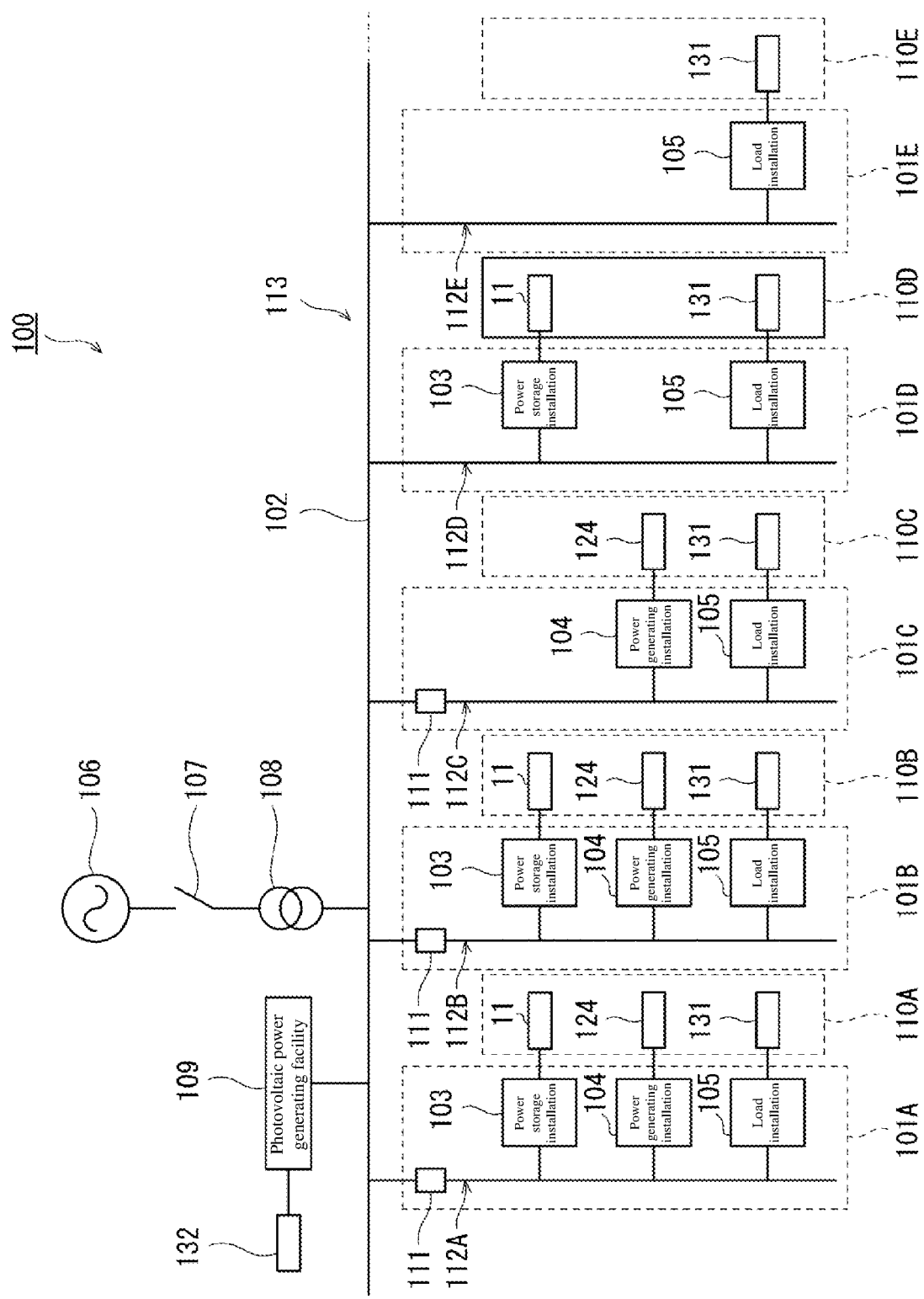
[Fig. 1]

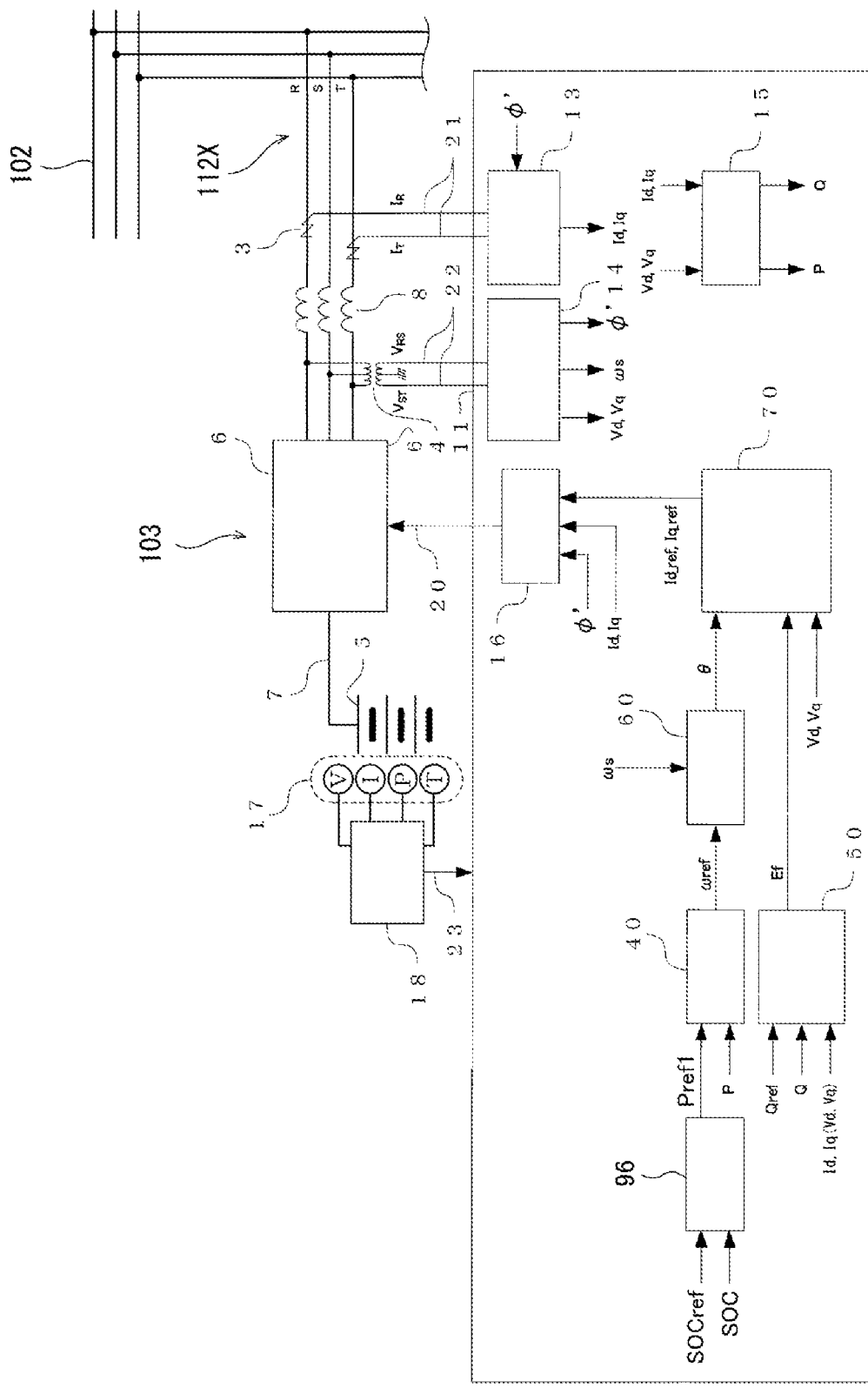
[Fig. 2]

[Fig. 3A]
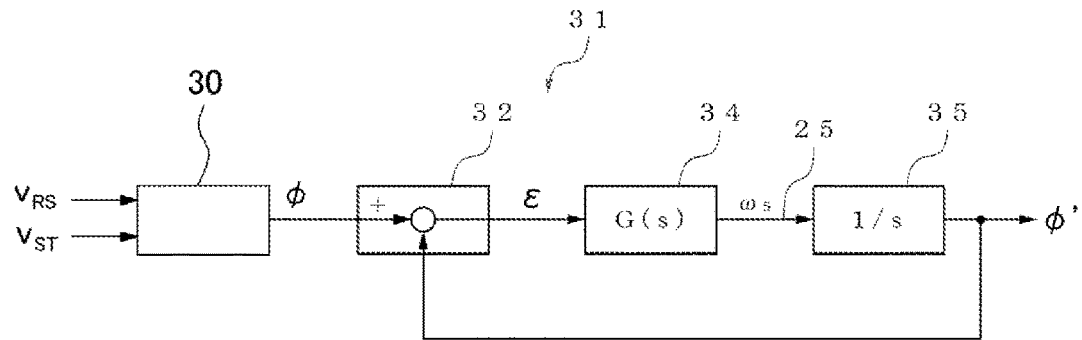
[Fig. 3B]
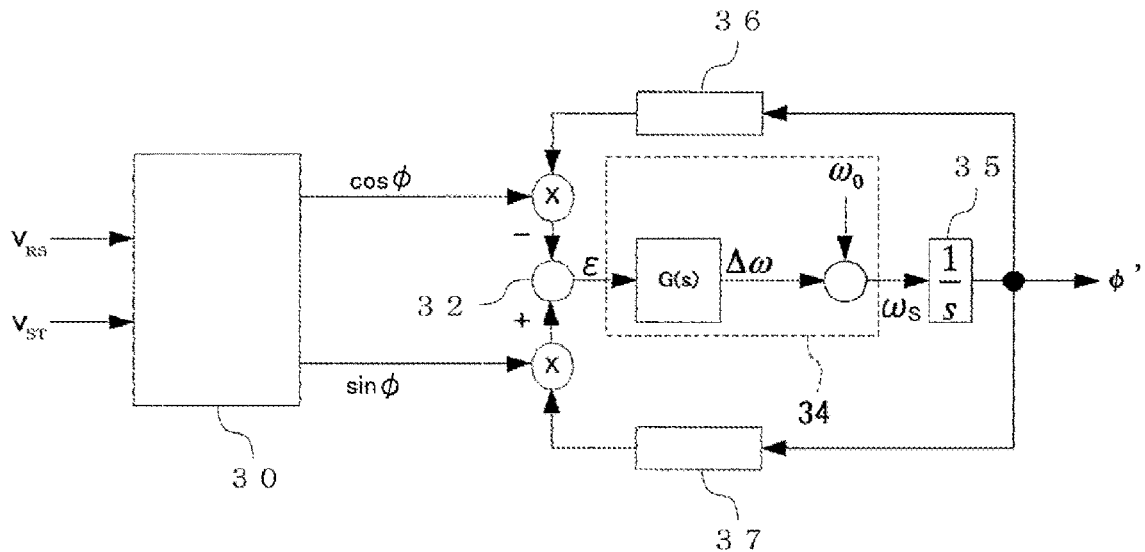
[Fig. 4]
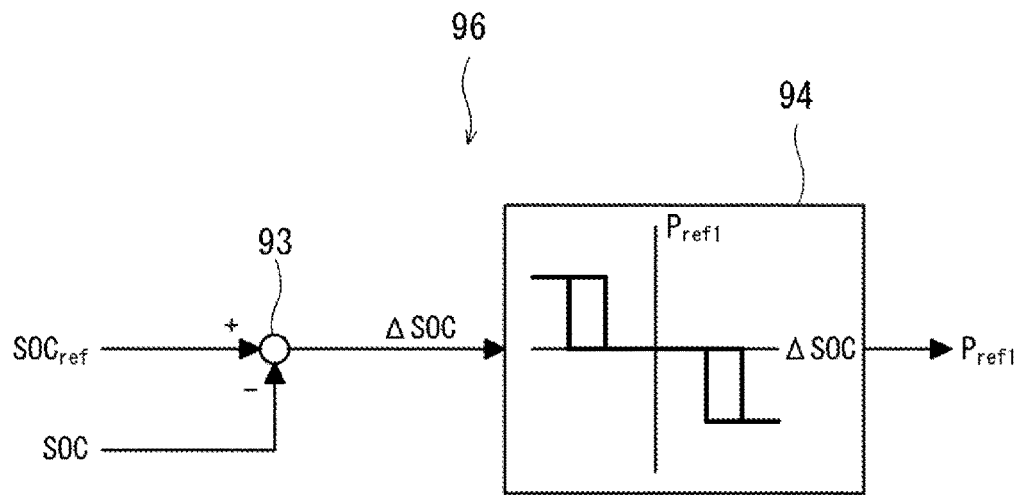

[Fig. 5A]
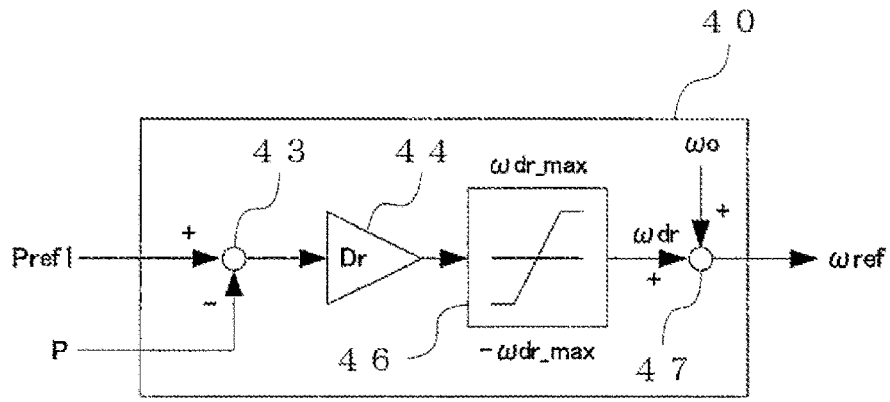
[Fig. 5B]
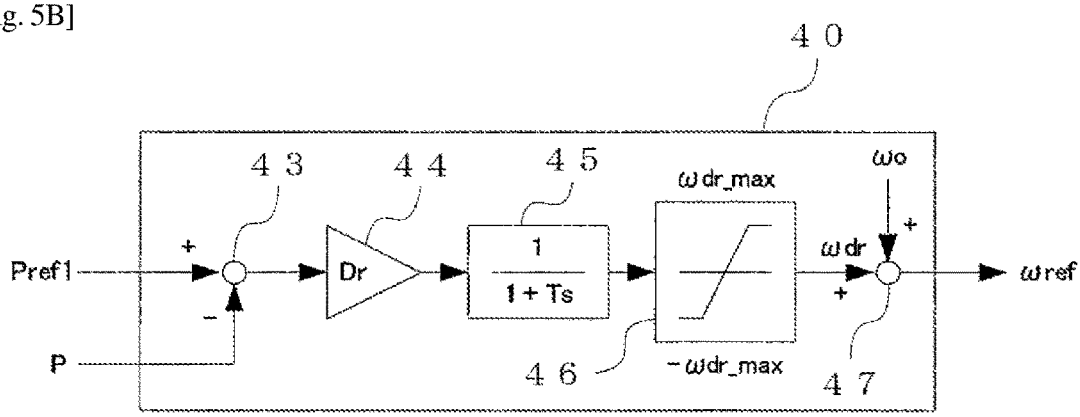
[Fig. 6A]
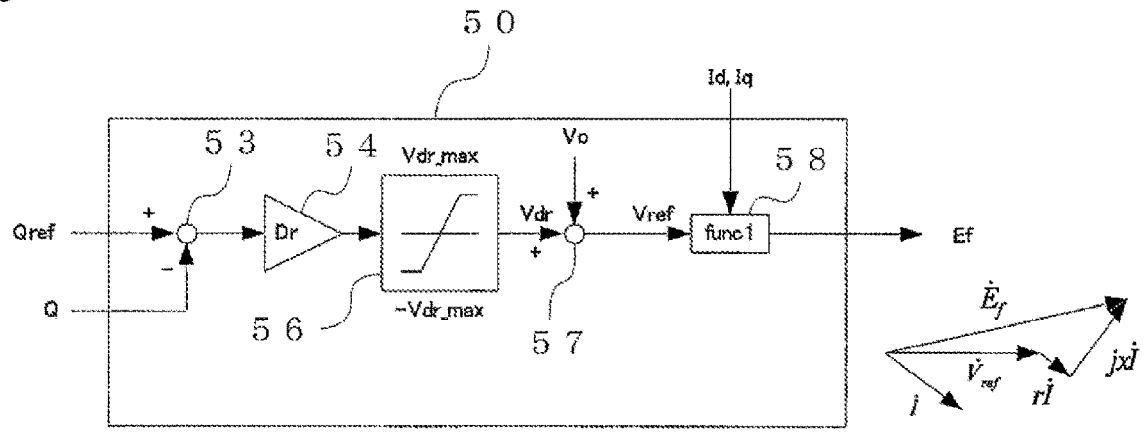

[Fig. 6B]
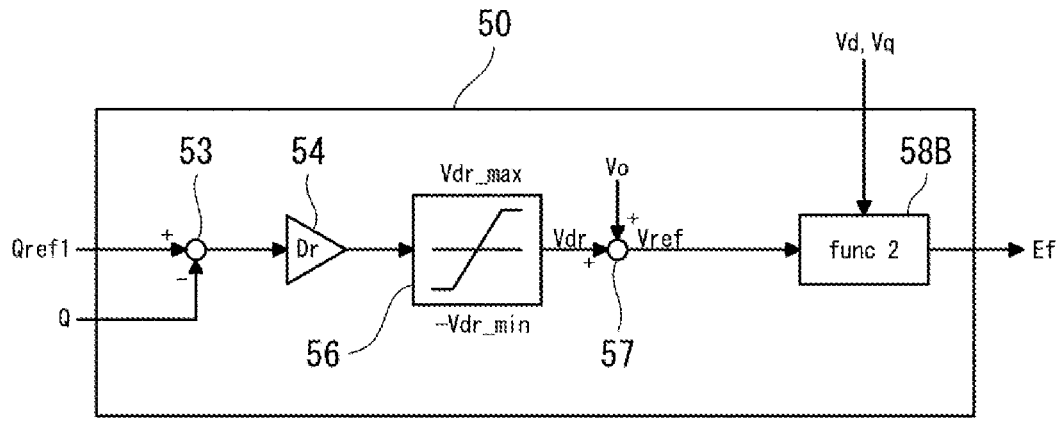
[Fig. 6C]
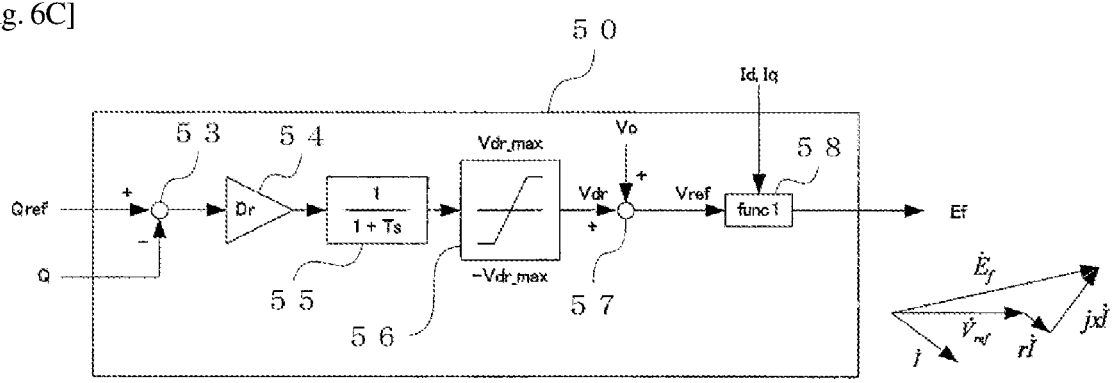
[Fig. 7]
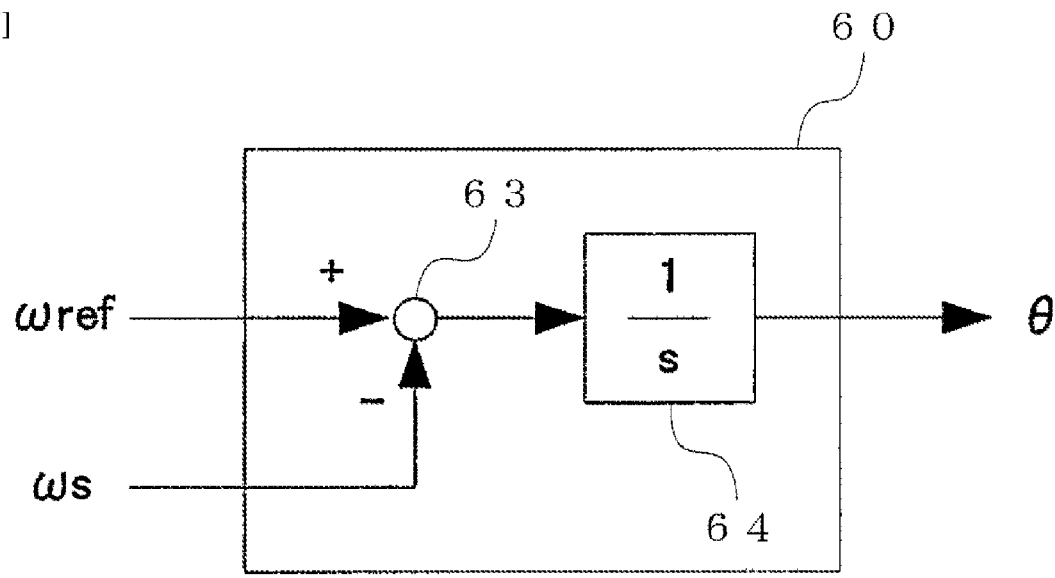

[Fig. 8A]
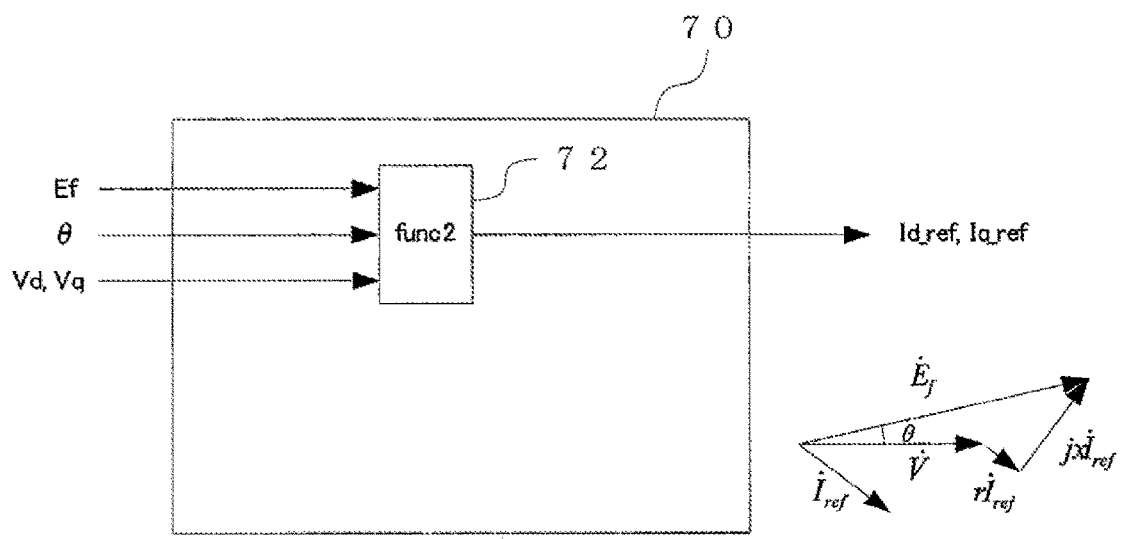
[Fig. 8B]
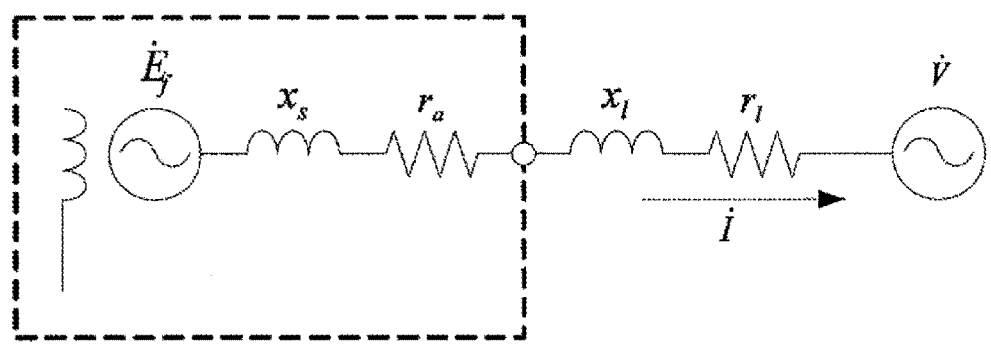

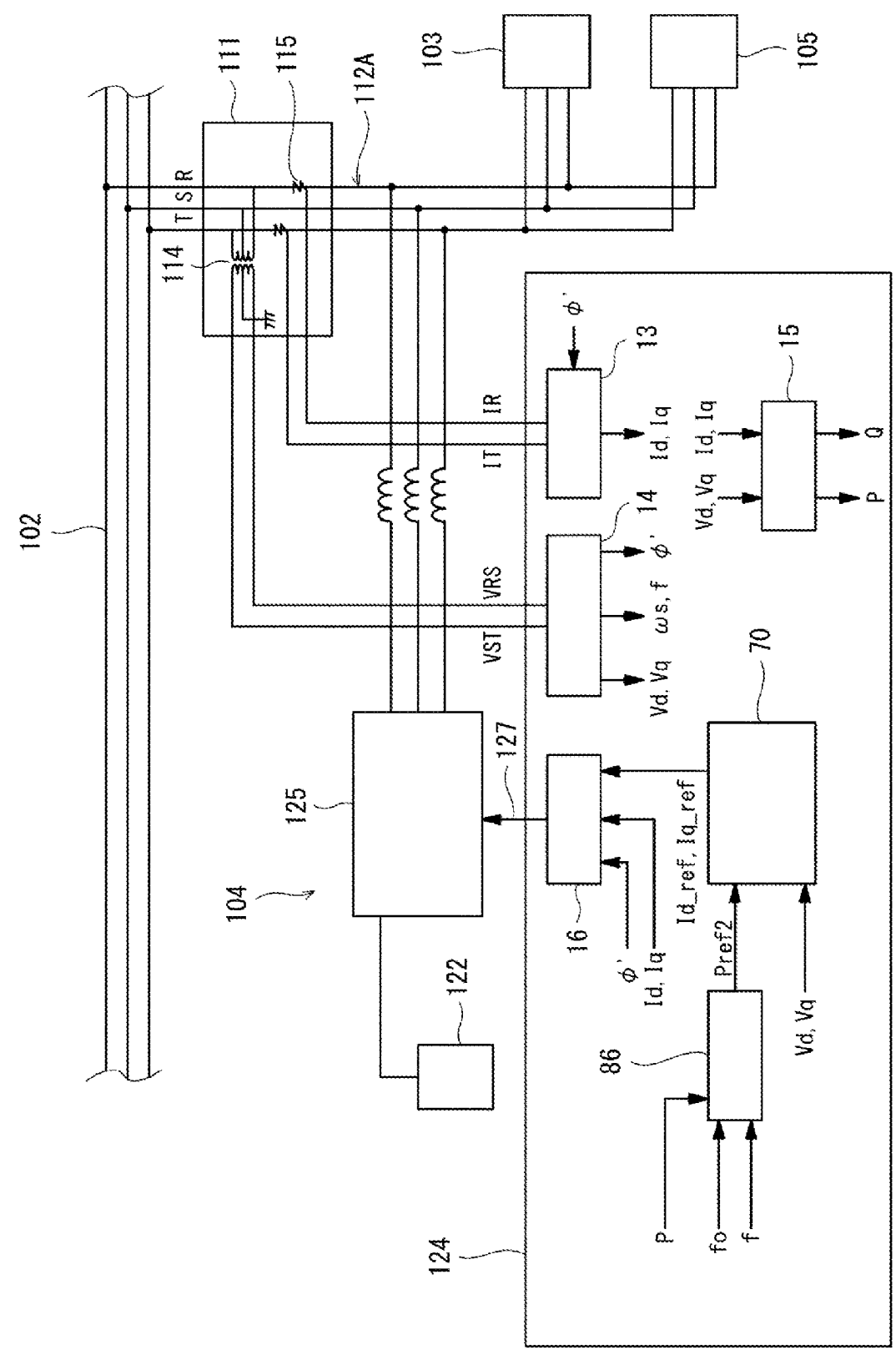
[Fig. 9]

[Fig. 10]
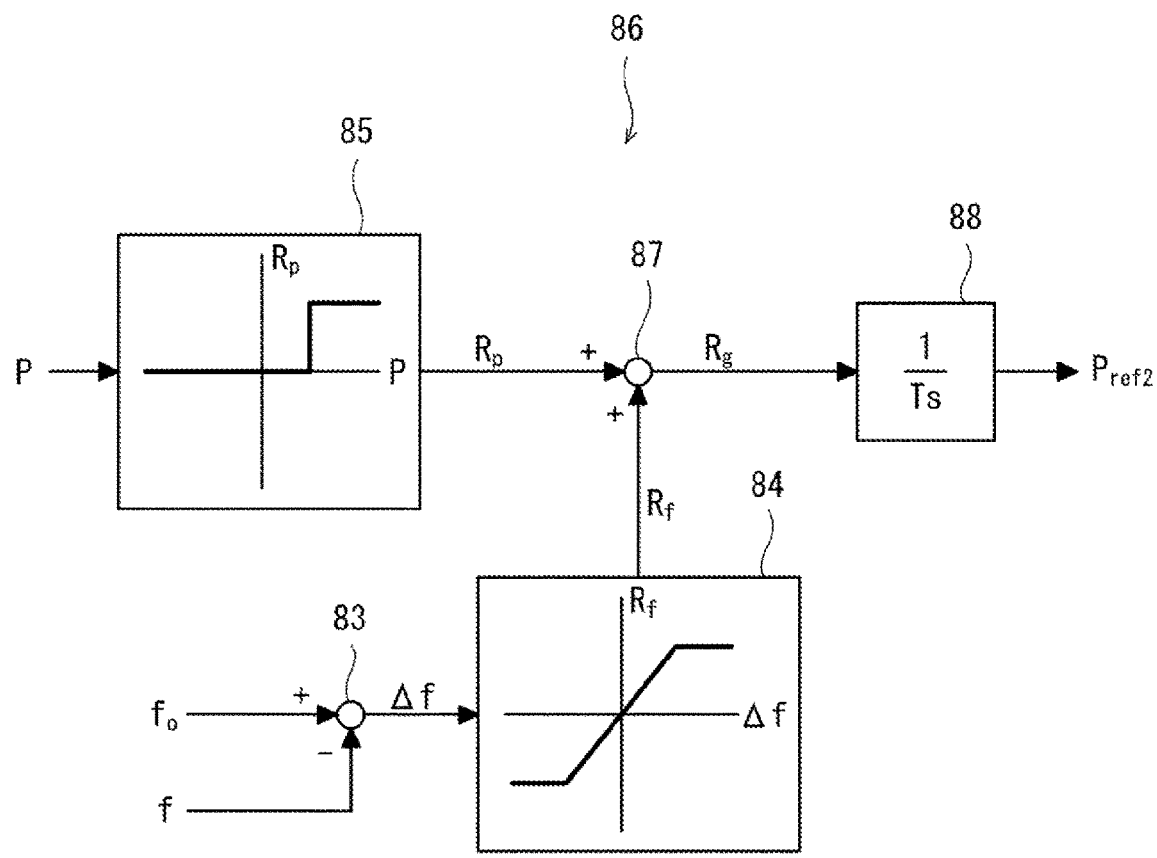

[Fig. 11]
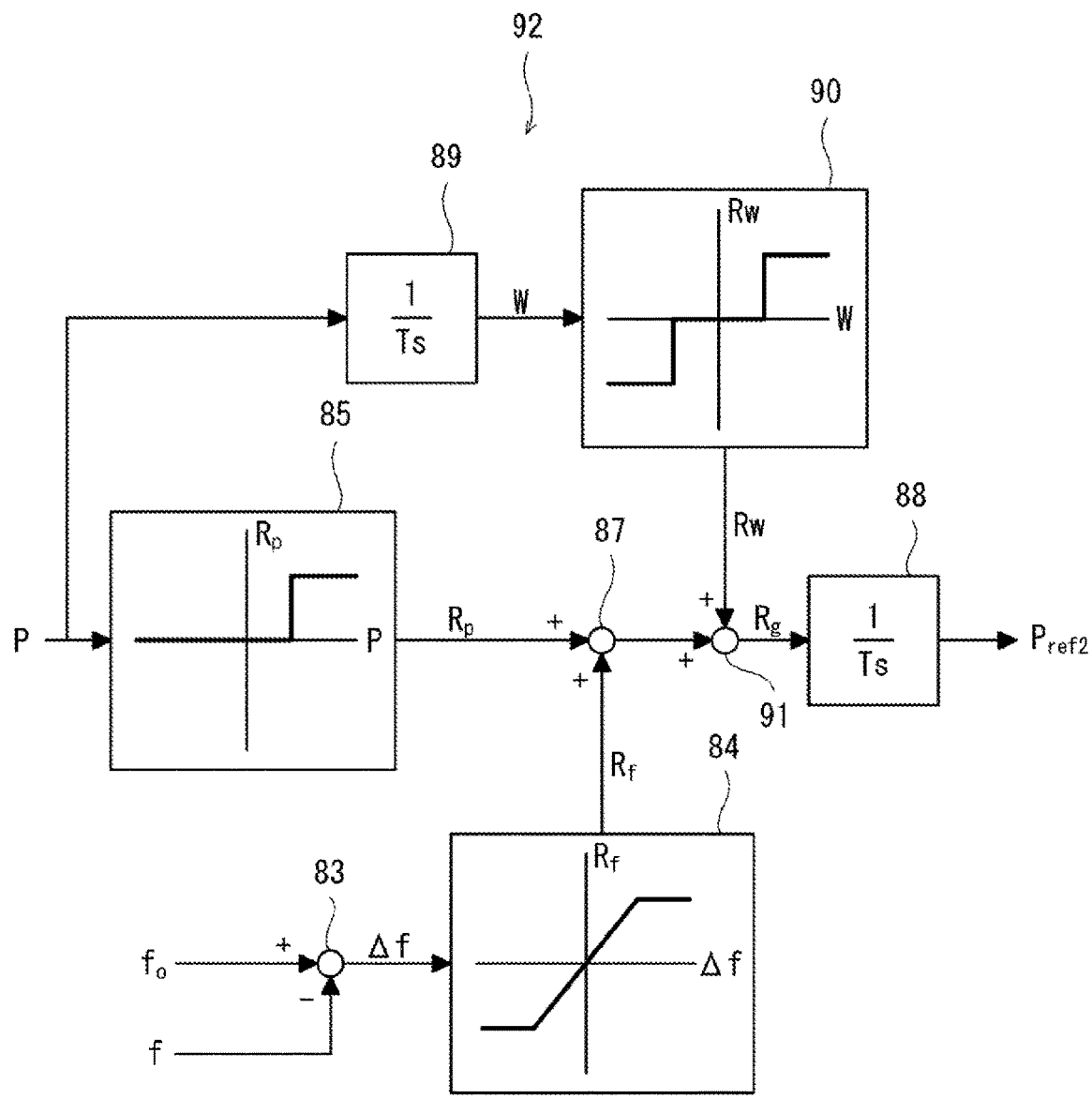

[Fig. 12A]
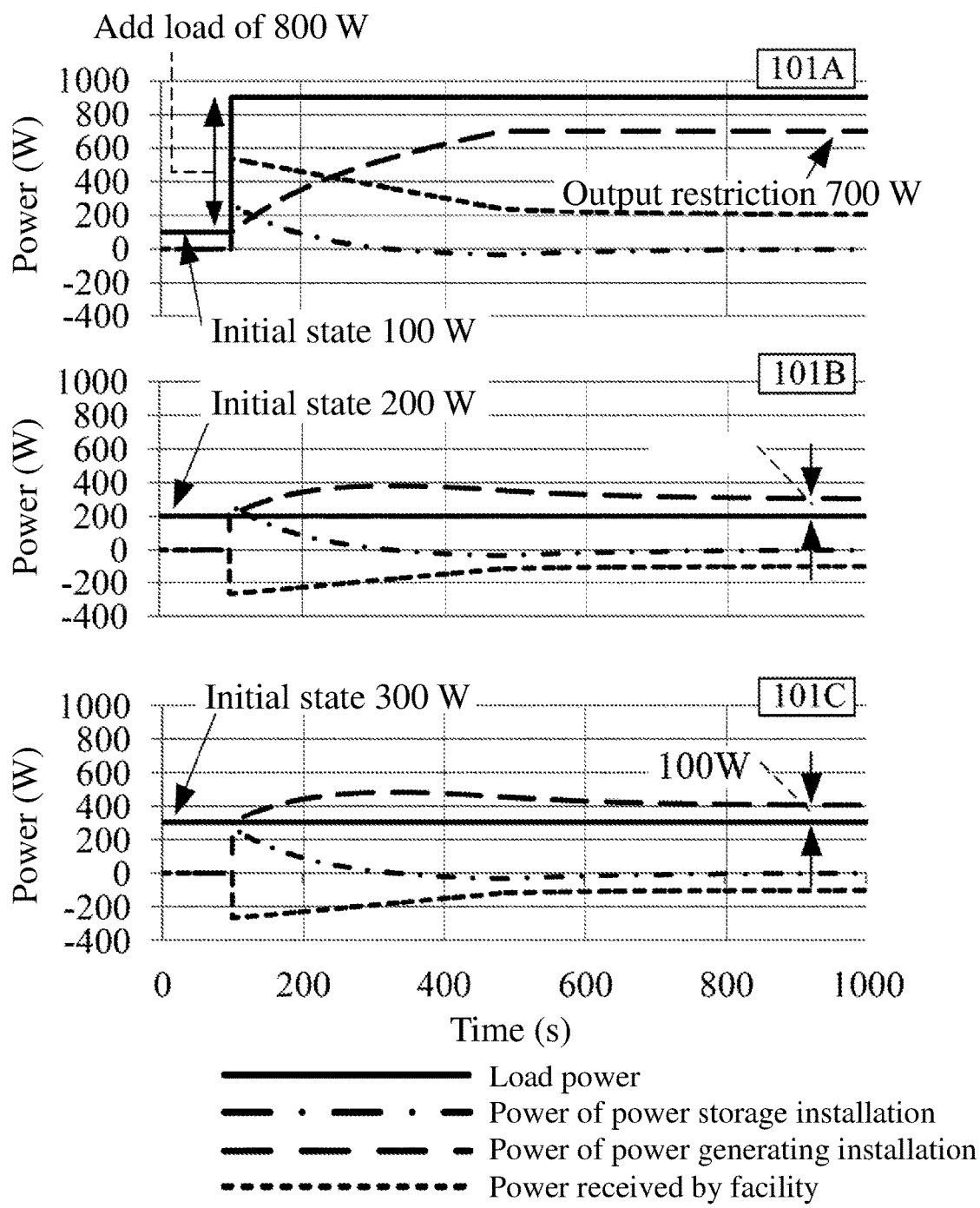

[Fig. 12B]
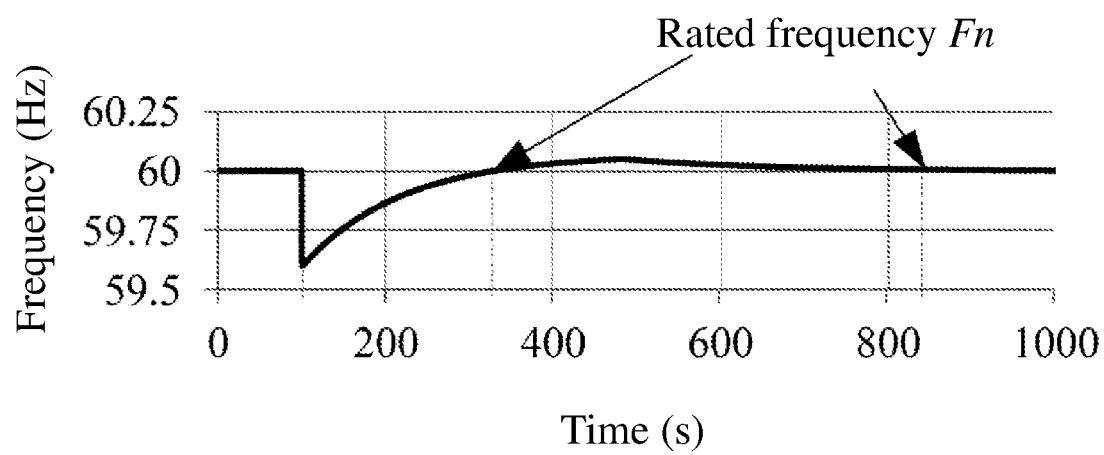

COMBINED POWER GENERATION SYSTEM

TECHNICAL FIELD

The present invention relates to a combined power generation system.

BACKGROUND ART

In a commercial power system supplied by a power company, maintenance and management of power supply quality are mainly performed by the power company.

On the other hand, a self-sustaining power supply system which is not connected to the commercial power system needs to perform maintenance and management of the power supply quality by oneself. Examples of such a self-sustaining power supply system include a microgrid in which plural types of power supplies such as power generating installations such as a fuel cell power generating installation, a photovoltaic power generating installation, and a diesel power generating installation and power storage installations such as a secondary battery and an electric double layer capacitor are combined and networked in a certain area, and the like.

In the power generating installations such as the fuel cell power generating installation and the photovoltaic power generating installation or the power storage installation, a power conversion device is provided for each power supply, and power output from each power supply is controlled. There are two types of power conversion devices such as a current control type and a voltage control type according to a control method thereof The current control type power conversion device is controlled to output a predetermined current regardless of a voltage or a frequency of a system connected thereto. The current control type power conversion device is mainly used as a power conversion device for system linkage. The voltage and frequency are premised to be maintained by other power generating installations (commercial system, motor generator, and the like), and the current control type power conversion devices cannot perform a self-sustaining operation alone or in combination.

On the other hand, the voltage control type power conversion device is controlled to output power with a constant voltage and frequency regardless of an output current. The voltage control type power conversion device is mainly used as a power conversion device for a self-sustaining operation alone. A linkage operation with the system and a parallel operation between the voltage control type power conversion devices cannot be used because the output becomes unstable.

For this reason, conventionally, in a case of switching from a state where the microgrid or the like operates in conjunction with the commercial power system to the self-sustaining operation, or from the self-sustaining operation to the commercial power system linked operation, the control method of the power conversion device needs to be switched.

In addition, in the self-sustaining power supply system, it is necessary to make the generated power and power consumption of a load coincide with each other all the times. Furthermore, when the power supply system is constituted by a plurality of power generating installations having different characteristics, it is necessary to appropriately adjust load sharing according to the characteristics of each power generating installation.

In order to solve such problems, PTL 1 discloses performing virtual generator model control which controls a power amount received from a power storage installation under the assumption that a virtual generator is connected to a power system, as a configuration which performs switching between a linkage operation with a power system and a self-sustaining operation without instantaneous interruption, performs autonomous load sharing among a plurality of power storage installations, or realizes system frequency stabilization in the short time.

CITATION LIST

Patent Literature

PTL 1: WO 2013/008413 A

SUMMARY OF INVENTION

Technical Problem

However, although the configuration of PTL 1 discloses the control for the power storage installation in detail, there is room for improvement of the control for the power generating installation.

An object of the present invention is to provide a combined power generation system that appropriately performs load sharing of a power generating installation, the combined power generation system including a power conversion device capable of performing parallel operation in a self-sustaining state without changing a control mode in a case of switching from a self-sustaining operation to a linkage operation or from a linkage operation to a self-sustaining operation.

Solution to Problem

According to an aspect of the present invention, a combined power generation system configures a power supply system where intra-facility power distribution systems respectively installed in a plurality of facilities are connected to each other to be capable of exchanging power with each other via an inter-facility power distribution system. Each of the intra-facility power distribution systems includes at least one of a power storage installation which has a power storage device and a first power converter connected to the power storage device to convert direct current power of the power storage device into predetermined alternating current power, a power generating installation which has a power generation device capable of performing output control, and a load installation which consume power, and the power supply system includes at least one power storage installation, at least one power generating installation, and at least one load installation. The combined power generation system includes a voltage measurer which measures a voltage of the power supply system, a frequency calculator which calculates a frequency of the power supply system from the voltage of the power supply system, a first system control device which controls the first power converter, and a second system control device which controls the power generation device. The intra-facility power distribution system including the power storage installation has a first measurer which measures a value for obtaining active power and reactive power at an output terminal of the first power converter, and the intra-facility power distribution system including the power generating installation has a received power measurer which measures received power supplied to the intra-facility power distribution system including the power generating installation. The first system control device includes a first active power command value calculation unit which calculates a first active power command value permitting a negative value so as to reduce a deviation between a state of charge (SOC) of the power storage device and an SOC command value of the power storage device; a first rotational speed command value calculation unit which calculates, for operating the power storage installation as a virtual generator, a first virtual rotational speed command value corresponding to a predetermined frequency droop characteristic and a predetermined inertia characteristic in the virtual generator from the first active power command value, active power obtained based on the value measured by the first measurer, and a reference rotational speed; a first internal phase difference angle calculation unit which calculates a first virtual internal phase difference angle of the virtual generator by integrating a deviation between the first virtual rotational speed command value and a virtual rotational speed calculated based on the frequency calculated by the frequency calculator, a first internal electromotive voltage command value calculation unit which calculates a first virtual internal electromotive voltage command value corresponding to a predetermined voltage droop characteristic in the virtual generator from a first reactive power command value, reactive power obtained based on the value measured by the first measurer, and a reference voltage; and a first current command value calculation unit which calculates a command value of an output current of the first power converter from the first virtual internal phase difference angle, the first virtual internal electromotive voltage command value, a voltage measured by the voltage measurer, and a predetermined internal impedance in the virtual generator, and the first system control device is configured to control the first power converter based on an output of the first current command value calculation unit. The second system control device includes a first generated power change rate command value calculation unit which calculates a first generated power change rate command value from a deviation between the frequency calculated by the frequency calculator and a frequency command value; a second generated power change rate command value calculation unit which calculates a second generated power change rate command value from the received power measured by the received power measurer; and a second active power command value calculation unit which calculates a second active power command value by integrating a generated power change rate command value that is obtained by adding the first generated power change rate command value and the second generated power change rate command value, and the second system control device is configured to control the power generation device based on an output of the second active power command value calculation unit. The first generated power change rate command value calculation unit outputs the first generated power change rate command value for increasing an amount of power generation of the power generation device when the frequency is lower than the frequency command value, and outputs the first generated power change rate command value for decreasing an amount of power generation of the power generation device when the frequency is higher than the frequency command value. The second generated power change rate command value calculation unit outputs the second generated power change rate command value for increasing an amount of power generation of the power generation device when the received power is a value indicating that the corresponding intra-facility power distribution system receives power and outputs the second generated power change rate command value for maintaining an amount of power generation of the power generation device when the received power is a value indicating that the corresponding intra-facility power distribution system transmits power.

According to the above configuration, the first system control device controls the charging and discharging of the power storage device using the first power converter, so the power storage installation functions as the virtual generator. That is, in the first system control device, a closed loop control system of active power, which is a form of current control, and a closed loop control system of a voltage of the power supply system, which is a form of voltage control, are synthesized, and each of the control systems incorporates a droop characteristic of the frequency and a droop characteristic of the reactive power. As a result, both the current and voltage control can operate consistently and operates similarly to the generator. Accordingly, the power storage installation functions as both a current control type and a voltage control type, and may be the power generating installation capable of performing parallel operation in the self-sustaining state without changing the control mode in the case of switching from the self-sustaining operation to the linkage operation or from the linkage operation to the self-sustaining operation. Moreover, since the control of the power storage installation is realized by software, in principle, the response speed is faster than an actual generator. Therefore, when the power supply system is in the self-sustaining operation, to cope with a sudden load fluctuation in the facility, the excess and deficiency of power due to the delay of the response of the power generating installation in the same facility can be compensated by the power storage installation. In addition, the power storage installation has frequency-to-power droop characteristics. For this reason, when the load increases, the amount of power fed back to the closed loop control system of the active power increases, so that the first power converter operates to decrease the frequency. On the other hand, when the load decreases, the first power converter operates to increase the frequency. Whereas, when the power storage device is charged, the first power converter operates to decrease the frequency in order to set the first active power command value which is a power command value of the closed loop control system of the active power to be a negative value. On the other hand, when the power storage device is discharged, the first power converter operates to increase the frequency by increasing the first active power command value.

Therefore, when the power supply system is in the self-sustaining operation, the frequency and voltage of the power supply system are maintained by the parallel operation of the power storage installation of each facility, and the frequency decreases when the sum of the load power and the charge and discharge power in the power supply system is larger than the sum of the power amount generated by the power generating installation, and the frequency increases when the sum of the load power and the charge and discharge power in the power supply system is smaller than the sum of the power amount generated by the power generating installation. Therefore, first, the change in load of the entire power supply system and the change in the SOC of each facility are compensated by changing the amount of power generation of the power generation device according to the change in frequency. Furthermore, the power received by the intra-facility power distribution system of the facility having the power generating installation is monitored, and when the received power is a value indicating that the corresponding intra-facility power distribution system receives power, the power generation device is controlled to increase the amount of power generation of the power generation device. Accordingly, it is possible to prevent the supply and demand balance of the entire power supply system from being collapsing by interchanging power between facilities which have room for power generation capacity and facilities with insufficient power generation capacity.

Therefore, according to the above configuration, it is possible to appropriately perform the load sharing of the power generating installation in the combined power generation system which includes the power conversion device capable of performing the parallel operation in the self-sustaining state without changing the control mode in the case of switching from the self-sustaining operation to the linkage operation or from the linkage operation to the self-sustaining operation.

The second active power command value calculation unit may also calculate the second active power command value so as to increase a degree of influence of the first generated power change rate command value on the second active power command value with respect to the second generated power change rate command value. Accordingly, the supply of power to the load installation disposed in the same facility as the power generating installation can be preferentially performed from the power generating installation while the supply and demand balance of power of the entire power supply system is maintained.

The first internal electromotive voltage command value calculation unit may include a second proportion calculator which proportionally calculates a deviation between the first reactive power command value and the reactive power obtained based on the value measured by the first measurer, and a second adder which adds a reference voltage to an output of the second proportion calculator to calculate the first virtual internal electromotive voltage command value.

The power generating installation may include the power generation device and a second power converter connected to the power generation device to convert power of the power generation device into predetermined alternating current power, and the second system control device may include a second current command value calculation unit which calculates a command value of an output current of the second power converter based on the second active power command value and may be configured to control the second power converter based on an output of the second current command value calculation unit. Accordingly, the output control of the power generation device can be suitably performed.

The power generation device may be a fuel cell, and the second power converter may be configured to convert direct current power of the fuel cell into alternating current power.

The power generation device is a power generation device using a generator driven by a motor and is configured so that the generator is directly incorporated into the intra-facility power distribution system synchronously, and a driving force of the motor driving the generator may be controlled so that an output of the generator follows the second active power command value.

The second system control device may control the power generating installation to start power generation when the frequency calculated by the frequency calculator becomes less than a preset first threshold value and a state where the frequency is less than the first threshold value is continued for a predetermined time, and the second system control device may control the power generating installation to stop power generation when the frequency becomes equal to or greater than a preset second threshold value as a value equal to or greater than the first threshold value and a state where the frequency is equal to or greater than the second threshold value is continued for a predetermined time. Accordingly, power can be supplied to the power supply system without changing the control mode when the power of the power supply system is insufficient, and the excessive supply of power can be suppressed, and thus the supply and demand balance of power in the power supply system can be stably maintained.

The combined power generation system includes a third system control device which controls the load installation, and the third system control device may control power consumed by the load installation to decrease when the frequency calculated by the frequency calculator is less than a preset third threshold value and a state where the frequency is less than the third threshold value is continued for a predetermined time. Accordingly, when the load on the power supply system increases, the supply of power to the load installation can be reduced without changing the control mode, and the supply and demand balance of power in the power supply system can be stably maintained.

The combined power generation system includes a power generating facility using natural energy and being connected to the power supply system and a fourth system control device which controls the power generating facility using natural energy, and the fourth system control device may control to decrease power generated by the power generating facility using natural energy when the frequency calculated by the frequency calculator becomes equal to or greater than a preset fourth threshold value and a state where the frequency is equal to or greater than the fourth threshold value is continued for a predetermined time. Accordingly, when the power of the power supply system is excessive, the supply of power to the power supply system can decrease without changing the control mode, and the supply and demand balance of power in the power supply system can be stably maintained.

The second system control device may include a command value correction calculation unit which corrects the second active power command value based on a value obtained by accumulating the received power. By accumulating the received power for each facility, the amount of supply and demand of power per regularly predetermined period for each facility is calculated. By correcting the second active power command value based on this, it is possible to perform supply and demand offset processing of power according to the amount of supply and demand of power per predetermined period for each facility. By using such an aspect, it is possible to simplify payment process of electric charge rate for each facility.

The "combined power generation system" according to the present invention is the power supply system including the power generating installation, the power storage installation, and the load installation, and may be a self-sustaining power supply system which may be linked with the commercial power system and may not be linked with the commercial power system. The self-sustaining power supply system may be a power supply system independent of the commercial power system. In the self-sustaining power supply system, generally, the frequency and voltage are determined by the supply and demand of power, not by factors dominating the system voltage or frequency like the commercial power system.

In the above configuration, the "power storage installation" includes the power storage device and the power converter. The "power storage device" is a battery or a capacitor capable of extracting direct current power. For example, the "power storage device" includes a primary battery, a secondary battery, and an electric double layer capacitor. The storage of electricity is sometimes referred to as charging and the extraction is sometimes referred to as discharging. In addition, the "power converter" includes a power conversion circuit including a switching element and a control device which performs ON/OFF control (pulse width modulation (PWM) control) of the switching element. The power conversion device according to the present invention is one including various measurers such as a voltmeter, in addition to the power converter.

The state of charge (SOC) command value, the frequency command value, and the internal impedance may be the preset numerical values, and may be constant values which can be changed, for example, can be set via a man-machine system. Similarly, the reference voltage and the reference rotational speed may be set values for the reference of the control operation, and may be changed via, for example, the man-machine system.

A PWM control unit of the power converter controls, for example, the switching element to be turned on/off so that the output current of the power converter becomes a given current command value. Such a power converter may be referred to as a current control type power converter.

The above objects, and other objects, features and advantages of the present invention will be apparent from the following detailed description of preferred embodiments with reference to the attached drawings.

Advantageous Effects of Invention

In accordance with the present invention, it is possible to appropriately perform load sharing of a power generating installation in a combined power generation system which includes a power conversion device capable of performing parallel operation in a self-sustaining state without changing a control mode in a case of switching from a self-sustaining operation to a linkage operation or from a linkage operation to a self-sustaining operation.

BRIEF DESCRIPTION OF DRAWINGS

FIG. 1 is a block diagram illustrating a schematic configuration of a combined power generation system according to an embodiment of the present invention.

FIG. 2 is a block diagram illustrating a schematic configuration of a power storage installation illustrated in FIG. 1.

FIG. 3A is a control block diagram illustrating a PLL calculation circuit in voltage/rotational speed/phase calculation unit illustrated in FIG. 2.

FIG. 3B is a diagram illustrating a more specific calculation content of the PLL calculation circuit illustrated in FIG. 3A.

FIG. 4 is a control block diagram illustrating a calculation content of a first active power command value calculation unit illustrated in FIG. 2.

FIG. 5A is a control block diagram illustrating an example of a calculation content of a rotational speed command value calculation unit illustrated in FIG. 2.

FIG. 5B is a control block diagram illustrating another example of the calculation content of the rotational speed command value calculation unit illustrated in FIG. 2.

FIG. 6A is a control block diagram illustrating an example of a calculation content of an internal electromotive voltage command value calculation unit illustrated in FIG. 2.

FIG. 6B is a control block diagram illustrating another example of the calculation content of the internal electromotive voltage command value calculation unit illustrated in FIG. 2.

FIG. 6C is a control block diagram illustrating another example of the calculation content of the internal electromotive voltage command value calculation unit illustrated in FIG. 2.

FIG. 7 is a control block diagram illustrating a calculation content of an internal phase difference angle calculation unit illustrated in FIG. 2.

FIG. 8A is a control block diagram illustrating a calculation content of a current command value calculation unit illustrated in FIG. 2.

FIG. 8B is a conceptual diagram of a power supply system according to the present embodiment.

FIG. 9 is a block diagram illustrating a schematic configuration in a case where the power generating installation shown in FIG. 1 is connected to an intra-facility power distribution system via a power converter.

FIG. 10 is a control block diagram illustrating an example of a calculation content of a second active power command value calculation unit illustrated in FIG. 9.

FIG. 11 is a control block diagram illustrating another example of the calculation content of the second active power command value calculation unit illustrated in FIG. 9.

FIG. 12A is a graph illustrating a simulation result according to an embodiment of the present invention.

FIG. 12B is a graph illustrating the simulation result according to the embodiment of the present invention.

DESCRIPTION OF EMBODIMENTS

Hereinafter, an embodiment of the present invention will be described with reference to the drawings. It should be noted that, hereinafter, elements having the same or similar functions in all the drawings are denoted by the same reference symbols and overlapped description thereof is omitted.

FIG. 1 is a block diagram illustrating a schematic configuration of a combined power generation system according to an embodiment of the present invention. As illustrated in FIG. 1, a combined power generation system 100 includes an alternating current (AC) power supply system 113 in which a plurality of facilities 101A to 101E (hereinafter, simply referred to as facilities 101X in some cases) are connected to each other to be capable of exchanging power with each other.

The plurality of facilities 101A to 101E include intra-facility power distribution systems 112A to 112E branched from an inter-facility power distribution system 102, respectively. At least one of a power storage installation 103, a power generating installation 104, and a load installation 105 is connected to each of the intra-facility power distribution systems 112A to 112E. Therefore, the intra-facility power distribution systems 112A to 112F are connected to the inter-facility power distribution system 102, so that the power supply system 113 includes at least one of the power storage installation 103, the power generating installation 104, and the load installation 105. In FIG. 1, each of the intra-facility power distribution systems 112A and 112B includes the power storage installation 103, the power generating installation 104, and the load installation 105, the intra-facility power distribution system 112C includes the power generating installation 104 and the load installation 105, the intra-facility power distribution system 112D includes the power storage installation 103 and the load installation 105, and the intra-facility power distribution system 112E includes the load installation 105. The number of facilities may be more or less than that described above. In addition, facilities having no load installation 105 may be connected to the intra-facility power distribution systems. As described above, if the facility 101X is, for example, a general house, a public facility, a plant, a building, or the like, and is a facility including at least one of the power storage installation 103, the power generating installation 104, and the load installation 105, the facility 101X may be a facility of the present combined power generation system 100.

The combined power generation system 100 includes a control device 110X which performs control related to power exchange of each installation provided in the corresponding facility 101X for each of the plurality of facilities 101X. The control device 110X includes at least any one of a first system control device 11 which controls the power storage installation 103, a second system control device 124 which controls the power generating installation 104, and a third system control device 131 which controls the load installation 105 according to the facility provided in corresponding facility 101X.

Each of the intra-facility power distribution systems 112A, 112B, and 112C including the power generating installation 104 has a received power measurer 111 which measures received power supplied to the intra-facility power distribution systems 112A, 112B, and 112C including the power generating installation 104. The received power measurer 111 is provided at a connection point (power receiving point) between each of the intra-facility power distribution systems 112A, 112B, and 112C and the inter-facility power distribution system 102.

The power supply system 113 is connected to a commercial system 106 via a breaker 107 and a transformer 108, and the breaker 107 opens and closes, so that the power supply system 113 is switched between a linked operation state with the commercial system 106 and a self-sustaining operation state from the commercial system 106. Furthermore, a photovoltaic power generating facility 109 which is a power generating facility using natural energy is connected to the power supply system 113. Each load installation 105 receives power supplied from at least one of the power storage installation 103, the power generating installation 104, the commercial system 106, and the photovoltaic power generating facility 109 and consumes the power. The photovoltaic power generating facility 109 is controlled by a fourth system control device 132. The photovoltaic power generating facility 109 may be installed independently of the facilities 101X as illustrated in FIG. 1 or may be installed as one installation constituting any one of the facilities 101X. In the combined power generation system 100, the photovoltaic power generating facility 109 is not an essential component. In addition, a power generating facility using other natural energy such as a wind power generating facility and the like may be installed in the combined power generation system 100 instead of the photovoltaic power generating facility 109.

Instead of the embodiment described above, a control device may be installed independently of each of the installations 103, 104, 105, and 109. In addition, one control device which controls the plurality of facilities 101X may be installed. In this case, the control devices of the power storage installation 103, power generating installation 104, and load installation 105 and the control device of the photovoltaic power generating facility 109 may be configured by one control device.

[Power Storage Installation]

First, a configuration of the power storage installation 103 will be described. FIG. 2 is a block diagram illustrating a schematic configuration of a power storage installation illustrated in FIG. 1. As illustrated in FIG. 2, each power storage installation 103 has a power storage device 5 and a first power converter 6 connected to the power storage device 5 to convert direct current power of the power storage device 5 into predetermined alternating current power.

The power storage device 5 is connected to the first power converter 6 via a direct current power line 7. The first power converter 6 turns on and off a power semiconductor device (not illustrated) at a high speed, so that direct current power from the power storage device 5 is converted into predetermined alternating current power and the converted power is output to the intra-facility power distribution systems 112X (X=A, B, . . . ) or alternating current power from the intra-facility power distribution systems 112X is converted into direct current power and the converted power charges the power storage device 5. A primary battery, a secondary battery, an electric double layer capacitor, and the like can be used as the power storage device 5.

In the intra-facility power distribution system 112X a voltage measurer 4 for measuring a voltage of the power supply system 113 and a frequency calculator for calculating a frequency from a voltage measured in the voltage measurer 4 and a current measurer 3 for measuring a current (power receiving current) flowing through the intra-facility power distribution systems 112X are installed. Instead of installing the voltage measurer 4 in each facility 101X a value measured by the voltage measurer 4 installed in any one of the power supply systems 113 may be commonly used in each facility 101X. An output of the voltage measurer 4 is connected to a voltage/rotational speed/phase calculation unit 14 of the first system control device 11 via wiring 22.

An output of the current measurer 3 is connected to a current calculation unit 13 of the first system control device 11 via wiring 21. The voltage measurer 4 is a transformer known as a potential transformer (PT) and the current measurer 3 is a transformer known as a current transformer (CT).

The first system control device 11 includes a first active power command value calculation unit 96, the current calculation unit 13, the voltage/rotational speed/phase calculation unit 14, an active and reactive calculation unit 15, a rotational speed command value calculation unit 40, an internal electromotive voltage command value calculation unit 50, an internal phase difference angle calculation unit 60, a current command value calculation unit 70, and a power converter control unit 16, and is configured to control the first power converter 6. The current command value calculation unit 70 in the first system control unit 16 functions as a first current command value calculation unit and the power converter control unit 16 functions as a first power converter control unit.

A gate driving signal 20 from the power converter control unit 16 is transmitted to the first power converter 6. The gate driving signal 20 performs PWM control of a gate of a power semiconductor device, so that the direct current power of the power storage device 5 is converted into alternating current power having a predetermined voltage, a rotational speed, and a phase and is supplied to the intra-facility power distribution system 112X. Alternatively, the alternating current power form the intra-facility power distribution system 112X is converted into direct current power to charge the power storage device 5.

A state detector 17 for detecting states of a battery such as a voltage, a current, a temperature, a pressure, and the like of the power storage device 5 is attached to the power storage device 5. A power storage device monitoring apparatus 18 monitors a state of the power storage device 5 and performs calculation of a state of charge (SOC) of the power storage device 5 based on a signal from the state detector 17.

The power storage device monitoring apparatus 18 is connected to the first system control device 11 via wiring 23. The first system control device 11 stops an operation of the first power converter 6 via the first power converter control unit 16 in a case where an abnormality is detected in the state of the power storage device 5. In addition, the first system control device 11 transmits the SOC of the power storage device 5 to the first system control device 11.

Next, a control mode of the power storage installation 103 in the present embodiment will be described. A calculation manner used in the following description is an example and other calculation methods deriving similar results can also be adopted.

(1) Voltage/Rotational Speed/Phase Calculation Unit (PLL Calculation Circuit)

FIG. 3A is a control block diagram illustrating a PLL calculation circuit in voltage/rotational speed/phase calculation unit illustrated in FIG. 2 and FIG. 3B is a diagram illustrating a more specific calculation content of the PLL calculation circuit illustrated in FIG. 3A.

The rotational speed and phase of the power supply system 113 are obtained by calculation in a PLL calculation circuit 31 based on a voltage signal from the voltage measurer 4. Specifically, instantaneous values $v_{RS}$, $v_{ST}$ of a line voltage of the power supply system 113 are measured by the voltage measurer 4 installed in the first power converter 6 and are input to the PLL calculation circuit 31. In the PLL calculation circuit 31, an estimation calculation of the rotational speed and phase of the power supply system 113 is performed using the instantaneous values $v_{RS}$, $v_{ST}$ at the voltage.

In the calculation block diagram of the PLL calculation circuit 31 illustrated in FIGS. 3A and 3B, the PLL calculation circuit 31 includes an $\alpha\beta$ converter 30 calculating a phase φ from line voltage values ($v_{RS}$, $v_{ST}$), a phase comparator 32 calculating a deviation between the phase φ calculated by the $\alpha\beta$ converter 30 and a phase φ' (hereinafter, estimation phase) estimated in the PLL calculation circuit 31, a loop filter 34 estimating an angular velocity (frequency) of the power supply system 113 from the phase deviation, and an integrator 35 integrating an estimated angular velocity and calculating the phase estimation phase φ'.

The phase φ of the power supply system 113 can be obtained by performing $\alpha\beta$ conversion of the instantaneous values $v_{RS}$, $v_{ST}$ of a system line voltage obtained from the voltage measurer 4. The instantaneous values of a phase voltage in each phase of the system are set as $v_R$, $v_S$, and $v_T$ and an instantaneous value vector $v_{\alpha\beta}$ is defined as the following mathematical formula.

$$v_{\alpha\beta} = \sqrt{\frac{2}{3}}\left(v_R + v_S e^{j\frac{2\pi}{3}} + v_T e^{j\frac{4\pi}{3}}\right) \quad \text{[Math. 1]}$$

The instantaneous value vector $v_{\alpha\beta}$ is expressed by Euler's formula ($e^{j\varphi}=\cos\varphi+j\sin\varphi$) as described below $$v_{\alpha\beta} = \quad \text{[Math. 2]}$$
$$v_\alpha + jv_\beta = \sqrt{\frac{2}{3}}\left\{\left(v_R - \frac{1}{2}v_S - \frac{1}{2}v_T\right) + j\left(\frac{\sqrt{3}}{2}v_S - \frac{\sqrt{3}}{2}v_T\right)\right\}$$

$$\begin{bmatrix} v_\alpha \\ v_\beta \end{bmatrix} = \sqrt{\frac{2}{3}}\begin{bmatrix} 1 & -1/2 & -1/2 \\ 0 & \sqrt{3}/2 & -\sqrt{3}/2 \end{bmatrix}\begin{bmatrix} v_R \\ v_S \\ v_T \end{bmatrix} \quad \text{[Math. 3]}$$

Here, the instantaneous value vector $v_{\alpha\beta}$ is a vector rotating at an angular velocity ω on a fixed coordinate system ($\alpha\beta$ axis) based on an a phase. Here, the angular velocity ω coincides with an angular frequency of the system voltage.

The system instantaneous line voltages $v_{RS}$, $v_{ST}$ and the instantaneous phase voltages $v_R$, $v_S$, and $v_T$ which are measured by the actual voltage measurer 4 have the following relationships.

$$v_{RS}=v_R-v_S \quad \text{[Math. 4]}$$

$$v_{ST}=v_S-v_T \quad \text{[Math. 5]}$$

Accordingly, the instantaneous value vector can be calculated from the instantaneous line voltage as described below $$v_\alpha = \sqrt{\frac{2}{3}}\left(v_R - \frac{1}{2}v_S - \frac{1}{2}v_T\right) = \quad \text{[Math. 6]}$$
$$\sqrt{\frac{2}{3}}\left(v_R - v_S + \frac{1}{2}v_S - \frac{1}{2}v_T\right) = \sqrt{\frac{2}{3}}(v_{RS} + v_{ST})$$

$$v_\beta = \sqrt{\frac{2}{3}}\left(\frac{\sqrt{3}}{2}v_S - \frac{\sqrt{3}}{2}v_T\right) = \frac{1}{\sqrt{2}}v_{ST} \quad \text{[Math. 7]}$$

In addition, in the $\alpha\beta$ converter 30, cos φ and sin φ are calculated by the following mathematical formulas.

$$\cos\phi = \frac{v_\alpha}{\sqrt{v_\alpha^2 + v_\beta^2}} \quad \text{[Math. 8]}$$

$$\sin\phi = \frac{v_\beta}{\sqrt{v_\alpha^2 + v_\beta^2}} \quad \text{[Math. 9]}$$

Each of the product of an output of a sin converter 36 and an output cos φ of the $\alpha\beta$ converter 30 and the product of an output of a cos converter 37 and an output sin φ of the $\alpha\beta$ converter 30 is input to the phase comparator 32. The phase comparator 32 calculates a deviation φ-φ' (hereinafter, referred to as phase deviation) between the phase φ obtained from the instantaneous value of the system voltage and the phase φ' estimated in the PLL calculation circuit 31. Specifically, the phase deviation is calculated by the calculation as described below. An output ε of the $\alpha\beta$ converter 30 (see FIG. 3B) is calculated from Math. 10 by Euler's formula.

$$\varepsilon = \sin\phi\cos\phi' - \cos\phi\sin\phi' = \sin(\phi - \phi') \quad \text{[Math. 10]}$$

Accordingly, in a case where φ-φ' is sufficiently small, ε=sin(φ-(φ') becomes almost equal to the φ-φ', therefore ε is regarded as the phase deviation φ-φ'.

The loop filter 34 calculates the rotational speed of the power supply system 113 from the phase deviation calculated by the phase comparator 32. A rotational speed (estimated synchronous rotational speed) $\omega_s$ of the power supply system 113 is obtained from an output of the loop filter 34. A transfer function G(s) of the loop filter is represented, for example, by the following mathematical formula.

$$G(s) = K_p\left(1 + \frac{1}{sT_I}\right)$$ [Math. 11]

The rotational speed $\omega_s$ is integrated by the integrator 35 to obtain the estimation phase $\varphi'$. Since the PLL calculation circuit operates such that the phase deviation $\varphi-\varphi'$ is set to be zero, it is apparent that the estimation phase $\varphi'$ and the estimated synchronous rotational speed $\omega_s$ are estimation values of the phase $\varphi$ and the rotational speed $\omega$, respectively.

Here, a dq coordinate system rotating at the estimated synchronous rotational speed $\omega_s$ with respect to the $\alpha\beta$ coordinate system is assumed and a voltage of the system is calculated by dq conversion. That is, a phase angle of the dq coordinate system with respect to the $\alpha\beta$ coordinate system is $\varphi'$, so that a voltage at the dq coordinate system is calculated by the following mathematical formula.

$$\dot{V}_{dq} = e^{-j\phi'}\dot{V}_{\alpha\beta}$$ [Math. 12]

$$\begin{bmatrix} V_d \\ V_q \end{bmatrix} = \begin{bmatrix} \cos\phi' & \sin\phi' \\ -\sin\phi' & \cos\phi' \end{bmatrix}\begin{bmatrix} V_\alpha \\ V_\beta \end{bmatrix}$$ [Math. 13]

As described above, the voltage/rotational speed/phase calculation unit 14 calculates the voltages $V_d$, $V_q$, the rotational speed $\omega_s$ of the power supply system 113, and the estimation phase $\varphi'$ from the instantaneous values $v_{RS}$, $v_{ST}$ of the line voltage from the voltage measurer 4.

(2) Current Calculation Unit

The current calculation unit 13 calculates currents $I_d$, $I_q$ by the following mathematical formula using the estimation phase $\varphi'$ calculated by the voltage/rotational speed/phase calculation unit 14 as input $$i_R + i_S + i_T = 0 \rightarrow i_S = -i_R - i_T$$ [Math. 14]

Accordingly, the current vector at the dq coordinate system is the following mathematical formula.

$$\begin{bmatrix} I_d \\ I_q \end{bmatrix} = \begin{bmatrix} \cos\phi' & \cos\left(\phi' - \frac{2}{3}\pi\right) & \cos\left(\phi' - \frac{4}{3}\pi\right) \\ -\sin\phi' & -\sin\left(\phi' - \frac{2}{3}\pi\right) & -\sin\left(\phi' - \frac{4}{3}\pi\right) \end{bmatrix}\begin{bmatrix} i_R \\ i_S \\ i_T \end{bmatrix}$$ [Math. 15]

(3) Active and Reactive Power Calculation Unit

The active and reactive power calculation unit 15 calculates active power P and reactive power Q using the voltages $V_d$, $V_q$ calculated by the voltage/rotational speed/phase calculation unit 14 and the currents $I_d$, $I_q$ calculated by the current calculation unit 13 as inputs. That is, in the present embodiment, the current measurer 3, the voltage measurer 4, the current calculation unit 13, the voltage/rotational speed/phase calculation unit 14, and the active and reactive power calculation unit 15 which are provided in the power storage installation 103 function as a first measurer which measures a value for obtaining active power and reactive power at an output terminal of a first power converter 6.

$$P = V_d I_d + V_q I_q$$

$$Q = -V_d I_q + V_q I_d$$ [Math. 16]

(4) First Active Power Command Value Calculation Unit

The first active power command value calculation unit 96 calculates a first active power command value $P_{ref1}$ based on a deviation between the SOC of the power storage device 5 and the SOC command value $SOC_{ref}$ of the power storage device 5. FIG. 4 is a control block diagram illustrating a calculation content of the first active power command value calculation unit 96 illustrated in FIG. 2. As illustrated in FIG. 4, the first active power command value calculation unit 96 has a subtractor 93 and an active power command value setter 94. The subtractor 93 calculates a deviation $\Delta SOC$ between the SOC command value $SOC_{ref}$ and the SOC calculated by the power storage device monitoring apparatus 18.

Here, the first active power command value calculation unit 96 is configured to set the first active power command value $P_{ref1}$ to be a negative value. That is, when the output $\Delta SOC$ of the subtractor 93 exceeds a predetermined value (for example, +10%), the first active power command value setter 94 sets the first active power command value $P_{ref1}$ to be a value (negative value, for example, 20% of rated power) for charging the power storage device 5. In addition, when the output $\Delta SOC$ of the subtractor 93 is less than a predetermined value (for example, −10%), the first active power command value setter 94 sets the first active power command value $P_{ref1}$ to be a value (positive value, for example, 20% of rated power) for discharging the power storage device 5. As described above, in the first active power command value calculation unit 96, an operation of a regenerative region in the virtual generator is assumed. Accordingly, as in the case of discharging the control at the time of charging the power storage installation 103 can be an aspect simulating the virtual generator.

As illustrated in FIG. 4, the active power command value setter 94 sets predetermined values (each on a charge side and a discharge side) for changing the first active power command value $P_{ref1}$ to have a hysteresis. In addition, instead of the example of FIG. 4, the first active power command value calculation unit 96 may calculate the first active power command value $P_{ref1}$ by multiplying the output $\Delta SOC$ of the subtractor 93 by a predetermined proportional gain K.

(5) Rotational Speed Command Value Calculation Unit

In order to operate the first power converter 6 as the virtual generator, the rotational speed command value calculation unit 40 calculates a virtual rotational speed command value $\omega_{ref}$ according to a predetermined frequency droop characteristic and a predetermined inertia characteristic in the virtual generator from the first active power command value $P_{ref1}$, the active power P, and the reference rotational speed $\omega_o$. The rotational speed command value calculation unit 40 of the power storage installation 103 functions as a first rotational speed command value calculation unit which calculates a first virtual rotational speed command value.

The rotational speed command value calculation unit 40 will be described in more detail. The rotational speed command value calculation unit 40 calculates the virtual rotational speed command value (first virtual rotational speed command value) $\omega_{ref}$ by proportional control from a deviation between the first active power command value $P_{ref1}$ and the active power P. Here, FIG. 5A is a control block diagram illustrating an example of a calculation content of the rotational speed command value calculation unit 40 illustrated in FIG. 2. As illustrated in FIG. 5A, the rotational speed command value calculation unit 40 includes the subtractor 43, a proportion controller (first proportion calculator) 44, an upper/lower limiter 46, and an adder (first adder) 47. The subtractor 43 subtracts the active power P from the first active power command value $P_{ref}$ and outputs the subtracted result to the proportion controller 44. The proportion controller 44 multiplies the output of the subtractor 43 by a proportional gain (Dr), and transmits the multiplied result to the upper/lower limiter 46 of the next stage. Then, the upper/lower limiter 46 limits and outputs the output of the proportion controller 44 between $\omega_{dr\_max}$ and $\omega_{dr\_min}$. The adder 47 adds the reference rotational speed $\omega_o$ to the output of the upper/lower limiter 46, and outputs the added result as the rotational speed command value $\omega_{ref}$.

FIG. 5B is a control block diagram illustrating another example of the calculation content of the rotational speed command value calculation unit 40 illustrated in FIG. 2. That is, as illustrated in FIG. 5B instead of FIG. 5A, a first-order lag calculation unit 45 may be disposed between the proportion controller 44 and the upper/lower limiter 46. The proportional gain (Dr) of the proportion controller 44 is adjusted so as to have a predetermined drooping characteristic between the active power and the rotational speed.

(6) Internal Electromotive Voltage Command Value Calculation Unit

FIRST EXAMPLE

FIG. 6A is a control block diagram illustrating an example of a calculation content of the internal electromotive voltage command value calculation unit 50 illustrated in FIG. 2. As illustrated in FIG. 6A, the internal electromotive voltage command value calculation unit 50 calculates an internal electromotive voltage command value $E_f$ by proportional control from a deviation between a reactive power command value $Q_{ref}$ and reactive power Q. The internal electromotive voltage command value calculation unit 50 of the power storage installation 103 functions as a first internal electromotive voltage command value calculation unit which calculates a first virtual internal electromotive voltage command value. Specifically, the internal electromotive voltage command value calculation unit 50 includes a subtractor 53, a proportion controller (second proportional operator) 54, an upper/lower limiter 56, an adder (second adder) 57, and a function calculator 58. The subtractor 53 subtracts the reactive power Q from the reactive power command value $Q_{ref}$, and outputs the subtracted result to the proportion controller 54. The proportion controller 54 multiplies the output of the subtractor 53 by a proportional gain (Dr), and transmits the multiplied result to the upper/lower limiter 56 of the next stage. Then, the upper/lower limiter 56 limits and outputs the output of the proportion controller 54 between $V_{dr\_max}$ and $V_{dr\_min}$. The adder 57 adds a voltage reference value $V_o$ to the output of the upper/lower limiter 56 to output a voltage target value $V_{ref}$. The voltage target value $V_{ref}$ is sent to the function calculator 58. The function calculator 58 performs the calculation shown in the following mathematical formulas, and outputs the internal electromotive voltage command value $E_f$.

$$E_{fd} = V_{ref} + rI_d - xI_q$$

$$E_{fq} = rI_q + xI_d$$

$$E_f = \sqrt{E_{fd}^2 + E_{fq}^2}$$ [Math. 17]

The internal electromotive voltage command value $E_f$ determined by the above mathematical formula may be obtained by subtracting, from the voltage target value $V_{ref}$ which is the output of the second adder 57, a voltage drop due to a total impedance (r, x) which is a sum of an internal impedance of the power storage installation and an external impedance between the power storage installation and the power supply system (see FIG. 8B to be described below). The internal impedance can be determined, for example, by Thevenin's theorem. As will be described later, the internal impedance in an actual motor is generally said to be a very small value (almost zero). The external impedance consists of a reactor and a wiring resistance provided between the first power converter 6 and the power supply system 113. Since a value of current flowing in the first power converter 6 is measured, the internal electromotive voltage can be obtained from the voltage value of the power supply system 113 by an inverse calculation if the total impedance is determined.

SECOND EXAMPLE

FIG. 6B is a control block diagram illustrating another example of the calculation content of the internal electromotive voltage command value calculation unit 50 illustrated in FIG. 2. As illustrated in FIG. 6B, the internal electromotive voltage command value calculation unit 50 calculates the internal electromotive voltage command value $E_f$ from a reactive power command value $Q_{ref}$ and reactive power Q. In this example, as in the example of FIG. 6A, the internal electromotive voltage command value calculation unit 50 includes the subtractor 53, the proportion controller (second proportional operator) 54, the upper/lower limiter 56, and the adder (second adder) 57. In the example of FIG. 6B, the internal electromotive voltage command value calculation unit 50 includes a second function calculator 58B having a different calculation formula instead of the function calculator 58 in FIG. 6A. The voltages $V_d$, $V_q$ are input to the second function calculator 58B instead of the currents $I_d$, $I_q$. The second function calculator 58B performs the calculation shown in the following mathematical formulas, and outputs the internal electromotive voltage command value $E_f$.

$$E_f = \left(K_{vp} + \frac{K_{vi}}{s}\right)(V_{ref} - V)$$ [Math. 18]

$$V = \sqrt{V_d^2 + V_q^2}$$

The internal electromotive voltage command value $E_f$ obtained by the above mathematical formula is a command value which droops the voltage command value according to a deviation of the reactive power to make the actual voltage follow the voltage command value. That is, the internal electromotive voltage command value $E_f$ in this example is a value obtained by simulating a voltage command value based on the control of a magnetic field by an automatic voltage regulator (AVR) performed by a normal generator.

THIRD EXAMPLE

FIG. 6C is a control block diagram illustrating another example of the calculation content of the internal electromotive voltage command value calculation unit 50 illustrated in FIG. 2. That is, as illustrated in FIG. 6C, the internal electromotive voltage command value calculation unit 50 includes a first-order lag calculation unit 55 disposed between the proportion controller 54 and the upper/lower limiter 56, instead of directly inputting the output of the proportion controller 54 to the upper/lower limiter 56 as illustrated in FIGS. 6A and 6B. The proportional gain (Dr) is adjusted to have a predetermined drooping characteristic between the reactive power and the output voltage.

(7) Internal Phase Difference Angle Calculation Unit

FIG. 7 is a control block diagram illustrating a calculation content of an internal phase difference angle calculation unit 60 illustrated in FIG. 2. As illustrated in FIG. 7, the internal phase difference angle calculation unit 60 calculates an internal phase difference angle θ from a deviation between the virtual rotational speed command value $\omega_{ref}$ and a synchronous rotational speed $\omega_s$ of the power supply system 113. The internal phase difference angle calculation unit 60 of the power storage installation 103 functions as a first internal phase difference angle calculation unit which calculates a virtual first internal phase difference angle. Specifically, the internal phase difference angle calculation unit 60 has a subtractor 63 and an integrator 64. The subtractor 63 calculates the deviation between the rotational speed command value $\omega_{ref}$ and the synchronous rotational speed $\omega_s$. The integrator 64 provided in the next stage of the subtractor 63 integrates this deviation and outputs the integrated result as an internal phase difference angle θ. In the present embodiment, a rotational speed (unit: rpm) is compared using the virtual rotational speed command value $\omega_{ref}$ and the synchronous rotational speed $\omega_s$, but an angular velocity (unit: rad/sec), the number of revolutions (unit: Hz) and the like may be compared. In the present invention, the angular velocity, the number of revolutions, and the frequency are concepts equivalent to the rotational speed. Therefore, the frequency of the power supply system 113 described below is also obtained from the synchronous rotational speed $\omega_s$ in the voltage/rotational speed/phase calculation unit 14.

(8) Current Command Value Calculation Unit

FIG. 8A is a control block diagram illustrating a calculation content of a current command value calculation unit 70 illustrated in FIG. 2. In addition, FIG. 8B is a conceptual diagram of the power supply system according to the present embodiment. As illustrated in FIG. 8A, in the current command value calculation unit 70, the internal electromotive voltage command value $E_f$, the internal phase difference angle θ, and the voltages $V_d$, $V_q$ are input to a function calculator 72. The function calculator 72 performs a calculation of the following mathematical formulas, and outputs current command values $I_{d\_ref}$, $I_{q\_ref}$ to the power converter control unit 16.

$$\Delta V_d + j\Delta V_q = (E_f \cos\theta - V_d) + j(E_f \sin\theta - V_q) \qquad \text{[Math. 19]}$$

$$I_{d\_ref} = \frac{1}{r^2 + x^2}(r\Delta V_d + x\Delta V_q)$$

$$I_{q\_ref} = \frac{1}{r^2 + x^2}(r\Delta V_q - x\Delta V_d)$$

The current value determined by the above mathematical formula is a value of current flowing in the total impedance, if it is assumed that the total impedance is connected between the power supply of the system voltage measured by the voltage measurer 4 and the power supply of the internal electromotive voltage command value voltage. The current value is output as a first current command value from the current command value calculation unit 70 of the power storage installation 103 (see FIG. 8B).

Incidentally, internal impedance $r_a$, $x_s$ of the actual power storage installation 103 is almost equal to zero, and the total impedance $r=r_a+r_l$, $x=x_s+x_l$ is almost equal to external impedance $r_l$ and $x_l$ between the power storage installation 103 and the power supply system 113. However, as described above, in the present embodiment, when the internal electromotive voltage command value $E_f$ and the first current command values $I_{d\_ref}$, $I_{q\_ref}$ are calculated, the total impedance which is the sum of the internal impedance of the power storage installation 103 and the external impedance between the power storage installation 103 and the power supply system 113 is used. In particular, the internal impedance of the power storage installation 103 virtually increases to obtain the total impedance, and when the internal electromotive voltage command value $E_f$ and the first current command values $I_{d\_ref}$, $I_{q\_ref}$ are calculated using the virtual impedance, the stable operation can be achieved. The reason is as follows: when the plurality of first power converters 6 operate in parallel, the output balance largely collapses due to a slight voltage difference between the first power converters 6 because the impedance of the first power converter 6 is low, and the impedance of the first power converter 6 increases by virtually increasing the internal impedance of the power storage installation 103, and as a result, the output balance can be prevented from being unstable due to the voltage difference. For example, since the internal impedance is substantially zero, if a resistance component is 0.1 pu and a reactance component is 0.4 pu in the total impedance, considerable stabilization can be achieved.

That is, when the virtual first power converter 6 generates an internal electromotive voltage obtained by the internal electromotive voltage command value calculation unit 50 and the internal phase difference angle calculation unit 60, the current command value calculation unit 70 estimates the current value output to the intra-facility power distribution system 112X.

Accordingly, the apparent impedance of the first power converter 6 increases, and the system is suppressed from becoming unstable even in the case of any one of the linkage operation with the commercial system 106 and the parallel operation of the power conversion devices.

(9) Power Converter Control Unit

The power converter control unit 16 receives the estimation phase φ' calculated by the voltage/rotational speed/phase calculation unit 14, the currents $I_d$, $I_q$ calculated by the current calculation unit 13, and the first current command values $I_{d\_ref}$, $I_{q\_ref}$ calculated by the current command value calculation unit 70. The power converter control unit 16 outputs the gate driving signal 20 such that the output current of the first power converter 6 becomes the first current command value calculated by the current command value calculation unit 70.

In the power storage device monitoring apparatus 18, if abnormality is detected in the power storage device 5, a battery abnormality signal is transmitted to the power converter control unit 16 of the system control device 11 via the wiring 23, and the transmission of the gate driving signal 20 is stopped. Accordingly, the operation of the first power converter 6 is stopped, so that the power storage device 5 can be protected. Examples of the abnormality of the power storage device include overcurrent, voltage drop, overvoltage, overcharge, overdischarge, battery temperature abnormality, battery pressure abnormality, device abnormality and the like.

The power storage device monitoring apparatus 18 calculates the SOC of the power storage device 5 and transmits the calculated SOC to the system control device 11 via the wiring 23. The SOC is calculated by correcting the SOC (integrated SOC) obtained by accumulating the current flowing in the power storage device with the SOC (instantaneous SOC) obtained from the current, the voltage, and the temperature.

When the SOC of the power storage device 5 is smaller than the SOC command value to be targeted, the power converter 6 controls the output of the active power to decrease, and conversely, when the SOC of the power storage device 5 is larger than the SOC command value to be targeted, the power converter 6 controls the output of the active power to increase. As a result, the SOC of the power storage device 5 is maintained in an appropriate range.

[Power Generating Installation]

Next, a configuration of the power generating installation 104 will be described. FIG. 9 is a block diagram illustrating a schematic configuration in a case where the power generating installation illustrated in FIG. 1 is connected to the intra-facility power distribution system via the power converter. In FIG. 9, those common to the control block of the first system control device 11 illustrated in FIG. 2 are denoted by the same reference numbers, and the description thereof will be omitted. Further, although the example of FIG. 9 illustrates the intra-facility power distribution system 112A to which the power storage installation 103 and the load installation 105 are connected in addition to the power generating installation 104, the power generating installation 104 can employ the same configuration as the example of FIG. 9 even when the power storage installation 103 and/or the load installation 105 are not connected (for example, the intra-facility power distribution systems 112B and 112C and the like) as long as the power generating installation 104 is connected to the intra-facility power distribution system 112A.

As illustrated in FIG. 9, each of the power generating installations 104 has a power generation device 122 and a second power converter 125 connected to the power generation device 122 to convert power of the power generation device 122 into predetermined AC power. The power generation device 122 is a power generation device capable of performing output control, and for example, a fuel cell power generation device, or a motor driven power generation device such as a diesel power generation device and a turbine power generation device can be employed. Even if the power generation device is a photovoltaic power generation device, a wind power generation device or the like, whose power output is dependent on natural conditions, it can be employed as long as output control is possible. Further, the second power converter 125 may not be provided in the motor driven power generation device.

As illustrated in FIG. 9, the power generation device 122 (for example, a fuel cell power generation device) is connected to the power generating installation 104. The power generation device 122 is connected to the second power converter 125. The second power converter 125 operates by receiving a gate driving signal 127 from the second system control device 124 via a wiring. The second system control device 124 is configured to control the second power converter 125. The received power measurer 111 includes a current measurer 115 which measures the current of the intra-facility power distribution system 112A, and a voltage measurer 114 which measures the voltage of the intra-facility power distribution system 112A. The current measured by the current measurer 115 and the voltage measured by the voltage measurer 114 are input to the second system control device 124.

The voltage/rotational speed/phase calculation unit 14 of the power generating installation 104 functions as a frequency calculator which calculates the frequency of the power supply system 113. That is, the voltage/rotational speed/phase calculation unit 14 calculates frequency $f$ ($=\omega_s/2\pi$) from the rotational speed $\omega_s$ of the power supply system 113. The active and reactive power calculation unit 15 calculates the active power P and the reactive power Q using the voltages $V_d$, $V_q$ calculated by the voltage/rotational speed/phase calculation unit 14 and the currents $I_d$, $I_q$ calculated by the current calculation unit 13 as inputs. The active power P output from the active and reactive power calculation unit 15 is received power P supplied to the intra-facility power distribution system 112A. Therefore, the received power P supplied to the intra-facility power distribution system 112A can be obtained from the current and voltage measured by the received power measurer 111.

A second active power command value calculation unit 86 calculates a second active power command value $P_{ref2}$ based on the frequency $f$ of the power supply system 113 calculated by the voltage/rotational speed/phase calculation unit 14, a reference frequency $f_o$, and the received power P calculated by the active and reactive power calculation unit 15. The current command value calculation unit 70 of the power generating installation 104 receives the second active power command value $P_{ref2}$ and the system voltages $V_d$, $V_q$, and outputs the current command values $I_{d\_ref}$, $I_{q\_ref}$ that the second power converter 125 should output. The mathematical formula for this is given by, for example, the following mathematical formula.

$$I_{d\_ref} = \frac{V_d}{V_d^2 + V_q^2} P_{ref2} \quad \text{[Math. 20]}$$

$$I_{q\_ref} = \frac{V_q}{V_d^2 + V_q^2} P_{ref2}$$

On the other hand, when the power generating installation 104 is a motor driven power generating installation, a power control loop may be configured which sets the second active power command value $P_{ref2}$ to be a target value by well-known governor control without providing the second power converter 125. That is, when the power generation device 122 employs a power generation device using a motor driven generator, the power generation device 122 is configured so that the generator is directly incorporated into the intra-facility power distribution system 112A synchronously, and the driving force of the motor driving the generator may be controlled so that the output of the generator follows the second active power command value $P_{ref2}$.

FIG. 10 is a control block diagram illustrating an example of a calculation content of the second active power command value calculation unit 86 illustrated in FIG. 9. The second active power command value calculation unit 86 includes a subtractor 83, a first generated power change rate command value calculation unit 84, a second generated power change rate command value calculation unit 85, an adder 87, and an integrator 88. The subtractor 83 calculates a deviation $\Delta f$ ($=f_o-f$) between the frequency $f$ of the power supply system 113 and the frequency command value (reference frequency) $f_o$. The first generated power change rate command value calculation unit 84 calculates a first generated power change rate command value $R_f$ from the deviation $\Delta f$. The first generated power change rate command value calculation unit 84 outputs the first generated power change rate command value $R_f$ for increasing an amount of power generation of the power generation device 122 when the frequency f is lower than the reference frequency $f_o$, and outputs the first generated power change rate command value $R_f$ for decreasing an amount of power generation of the power generation device 122 when the frequency f is higher than the reference frequency $f_o$. For example, the first generated power change rate command value calculation unit 84 changes the first generated power change rate command value $R_f$ so that the first generated power change rate command value $R_f$ increases by 20%/min for each deviation $\Delta f$ of +2%, and changes the first generated power change rate command value $R_f$ so that the first generated power change rate command value $R_f$ decreases by 20%/min for each deviation $\Delta f$ of −2%.

The second generated power change rate command value calculation unit 85 calculates a second generated power change rate command value $R_p$ from the received power P of the corresponding intra-facility power distribution system 112A. In a case where the received power P is a value indicating that the corresponding intra-facility power distribution system receives power (P>0), the second generated power change rate command value calculation unit 85 outputs the second generated power change rate command value $R_p$ for increasing the amount of power generation of the power generation device 122.

For example, when the received power P is a positive value, the second generated power change rate command value calculation unit 85 changes the second generated power change rate command value $R_p$ by +10%/min. In the present embodiment, when the received power P is a predetermined positive value or more, the second generated power change rate command value calculation unit 85 outputs the second generated power change rate command value Rp for increasing the amount of power generation of the power generation device 122. That is, the second generated power change rate command value calculation unit 85 outputs a command value for maintaining the amount of power generation of the power generation device 122, regarding a period in which the received power P is 0 to the predetermined positive value as a dead zone. Further, in a case where the received power P is a value indicating that the corresponding facility 101X transmits power (P<0), the second generated power change rate command value calculation unit 85 outputs the second generated power change rate command value $R_p$ (that is, $R_p$=0) for maintaining the amount of power generation of the power generation device 122.

As described above, the second active power command value calculation unit 86 performs a setting so that the degree of influence of the first generated power change rate command value $R_f$ on the second generated power change rate command value $R_p$ is increased. For example, as described above, a change in the first generated power change rate command value $R_f$ based on the change in frequency is made with 20%/min as a minimum unit, whereas a change in the second generated power change rate command value $R_p$ based on the change in received power is made with 10%/min as a minimum unit.

The adder 87 outputs a generated power change rate command value $R_g$ obtained by adding the first generated power change rate command value $R_f$ and the second generated power change rate command value $R_p$. The integrator 88 calculates the second active power command value $P_{ref2}$ by integrating the generated power change rate command value $R_g$.

The second system control device 124 includes the current command value calculation unit 70, and the power converter control unit 16, similarly to the first system control device 11. The current command values $I_{d\_ref}$, $I_{q\_ref}$ output from the current command value calculation unit 70 of the second system control device 124 become second current command values which are command values of the output current of the second power converter 125.

Accordingly, in the present embodiment, the rotational speed command value calculation unit 40, the internal electromotive voltage command value calculation unit 50, the internal phase difference angle calculation unit 60, and the current command value calculation unit 70 of the first system control device 11 functions as the first rotational speed command value calculation unit, the first internal electromotive voltage command value calculation unit, the first internal phase difference angle calculation unit, and the first current command value calculation unit, respectively.

According to the configuration as described above, the first system control device 11 controls the charging and discharging of the power storage device 5 using the first power converter 6, so that the power storage installation 103 functions as a virtual generator. That is, in the power storage installation 103, a command value of the output current of the first power converter 6 is input, so that a closed loop control system of active power of the first power converter 6 and the frequency of the power supply system 113, and a closed loop control system of reactive power of the first power converter 6 and the voltage of the power supply system 113 are formed, and control amounts (amounts to be controlled) thereof are feedback-controlled.

Therefore, the power storage installation 103 functions as both the current control type and the voltage control type, and includes a power converter capable of performing parallel operation in a self-sustaining state without changing a control mode in a case of switching from a self-sustaining operation to a linkage operation, or switching from a linkage operation to a self-sustaining operation. Further, since the feedback control system of the power storage installation 103 is realized by software, not by an actual generator, a response speed is faster than the actual generator. Therefore, the first power converter 6 for the power storage installation 103 functioning as a virtual generator is used in addition to the second power converter 125 for the power generating installation 104, so that the excess and deficiency of the generated power of the power generating installation 104 to the load power can be compensated by the power storage installation 103 of which the response speed is faster in comparison to the power generating installation 104.

In more detail, first, a change in SOC of the power storage device is compensated using the first power converter 6 by the operation of the first system control device 11.

Next, in a case where the power supply system 113 is in the self-sustaining operation, the frequency of the power supply system 113 is increased or decreased according to the increase or decrease in an amount of load connected to the power supply system 113 and in an amount of the charging and discharging of the power storage installation by the operation of the power storage installation 103 as a virtual generator, so that according to the change in frequency, it is possible to achieve balance between the amount of the entire load of the power supply system 113 and the amount of the charging and discharging of the power storage installation, and the amount of power generation by increasing or decreasing the power generation output of the power generating installation 104.

Further, power generated by the power generating installation 104 of each facility is adjusted according to the received power amount of each facility, so that power consumed in each facility is adjusted to be generated in the same facility as far as possible. That is, it is possible to appropriately perform load sharing of the power generating installations 104 in the respective facilities.

In addition, the second active power command value $P_{ref2}$ is set to a value for increasing the degree of influence of the first generated power change rate command value $R_f$ on the second active power command value $P_{ref2}$ with respect to the second generated power change rate command value $R_p$. By doing so, the supply of power to the load installation 105 disposed in the same facility 101X as the power generating installation 104 can be preferentially performed from the power generating installation 104 while maintaining the supply and demand balance of power of the entire power supply system 113.

The second system control device 124 may control the power generating installation 104 to start power generation when the frequency f of the power supply system 113 calculated by the frequency calculator becomes less than a preset first threshold value and the state where the frequency f is less than the first threshold value is continued for a predetermined time, and the second system control device 124 may control the power generating installation 104 to stop power generation when the frequency f becomes equal to or greater than a preset second threshold value as a value equal to or greater than the first threshold value and the state where the frequency f is equal to or greater than the second threshold value is continued for a predetermined time. Accordingly, power can be supplied to the power supply system 113 without changing the control mode when the power of the power supply system 113 is insufficient, and the excessive supply of power can be suppressed, and thus the supply and demand balance of power in the power supply system 113 can be stably maintained.

In the present embodiment, an aspect in which the received power measurer 111 is provided in each of the intra-facility power distribution systems 112A, 112B, and 112C including the power generating installation 104 has been described, but the received power measurer 111 may be provided in other intra-facility power distribution systems 112D and 112E. The power received by each intra-facility power distribution system 112X is acquired, so that it is possible to grasp the power supply and demand situation between each facility 101X and other facilities. Accordingly, the second system control device 124 which controls the power generating installation 104 can adjust the amount of power generation of the power generating installation 104 according to the power supply and demand situation.

FIG. 11 is a control block diagram illustrating another example of the calculation content of the second active power command value calculation unit illustrated in FIG. 9. As illustrated in FIG. 11, the second system control device 124 may include a command value correction calculation unit 92 which corrects the second active power command value $P_{ref2}$ based on a value obtained by accumulating the received power. In the example in FIG. 11, the command value correction calculation unit 92 includes an integrator 89, a third generated power change rate command value calculation unit 90, and an adder 91.

The integrator 89 accumulates the received power P of the intra-facility power distribution system for a predetermined period, and outputs a power amount W of the facility. The power amount W of the facility becomes a negative value when the supply of power to the outside of the facility 101X is continued, and becomes a positive value when the reception of power in the facility 101X is continued. The third generated power change rate command value calculation unit 90 generates a third generated power change rate command value $R_W$ based on the power amount W of the facility output from the integrator 89. For example, when the power amount W of the facility is a positive value, the third generated power change rate command value calculation unit 90 changes the third generated power change rate command value $R_W$ by +5%/min. Further, when the power amount W of the facility is a negative value, the third generated power change rate command value calculation unit 90 changes the third generated power change rate command value $R_W$ by −5%/min. In the present embodiment, the third generated power change rate command value calculation unit 90 outputs a command value for maintaining the amount of power generation of the power generation device 122, regarding a period in which the power amount W of the facility is 0 to a predetermined value as a dead zone.

The adder 91 outputs the generated power change rate command value $R_g$ obtained by adding an output of the adder 87 obtained by adding the first generated power change rate command value $R_f$ and the second generated power change rate command value $R_p$, and the third generated power change rate command value $R_W$. Similarly to the example in FIG. 10, the integrator 88 calculates the second active power command value $P_{ref2}$ by integrating the generated power change rate command value $R_g$. Alternatively, the command value correction calculation unit 92 may add a corrected value of the second active power command value $P_{ref2}$ based on the power amount W of the facility to an output of the integrator 88.

As described above, by accumulating the received power for each facility 101X, the power supply and demand amount per regularly predetermined period is calculated for each facility 101X. By correcting the second active power command value $P_{ref2}$ based on this, it is possible to perform the supply and demand offset processing of power according to the power supply and demand amount per predetermined period for each facility 101X. That is, the second system control device 124 controls the amount of power generation of the power generating installation 104 in the facility 101X to increase when the power amount W in the facility 101X is excessively received power (positive value), and controls the amount of power generation of the power generating installation 104 in the facility 101X to decrease when the power amount W in the facility 101X is excessively transmitted power (negative value). Thus, the power generating installation 104 in the facility 101X is controlled so that the power amount W in the facility 101X approaches zero. By using such an aspect, it is possible to simplify payment process of electric charge rate for each facility 101X.

The third generated power change rate command value calculation unit 90 is configured to reduce the degree influence of the third generated power change rate command value $R_W$ on the first generated power change rate command value $R_f$ and the second generated power change rate command value $R_p$. Accordingly, it is possible to perform the supply and demand offset processing of power while suppressing the influence on the supply and demand balance.

[Load Installation]

In the present embodiment, the load power of the load installation 105 may be adjusted according to the power supply and demand situation of the entire power supply system 113. For example, the third system control device 131 controls the power consumed by the load installation 105 to decrease when the third system control device 131 is in a state where the frequency of the power supply system 113 is less than a preset third threshold value, and the state where the frequency of the power supply system 113 is less than the third threshold value is continued for a predetermined time.

According to the present embodiment, the supply and demand condition of the power supply system 113 can be determined from the fluctuation of the frequency of the power supply system 113. As described above, when the load power increases, the increment in load is temporarily shared and borne by the power storage installation 103 and the frequency of the power supply system 113 decreases based on the drooping characteristic in the virtual generator control for the first power converter 6 of the power storage installation 103. Based on the decrease in this frequency, each power generating installation 104 increases an output to maintain the supply and demand balance. When the load power further increases to exceed the power generation capacity of the power generating installation 104 and the outputs of all the power generating installations 104 reach an upper limit, the shortage is supplied from the power storage installation 103. As a result, the frequency of the power supply system 113 is lower than the reference frequency (rated frequency), and this state is continued. When the supply of power from the power storage installation 103 continues, the SOC of the power storage device 5 decreases, so that the first active power command value $P_{ref1}$ to the first power converter 6 becomes a negative value, and the frequency of the power supply system 113 further decreases (which becomes less than the third threshold value) due to the drooping characteristic of the virtual generator.

When such a state continues for a predetermined time, the third system control device 131 controlling the load installation 105 determines that the power supplied in the entire power supply system 113 is insufficient and performs the suppression operation or stop operation of the load installation 105. The order in which the suppression operation or the stop operation is performed in the plurality of load installations 105 can be adjusted by setting the amount of decrease in frequency and the threshold value of duration. In the case of suppressing or stopping the load installation 105, for example, the third system control device 131 may directly give a suppression instruction or a stop instruction, such as an output, to the load installation 105, or may be provided with a breaker (for example, an electromagnetic contactor and the like) which is connected to or disconnected from the connection point between the load installation 105 and the power supply system 113 and may issue an instruction to the breaker to shut down the connection between the load installation 105 and the power supply system 113. In addition, the third system control device 131 may notify an alarm or the like to the facility 101X in which the corresponding load installation 105 is included, and urge the user of the load installation 105 to save power.

As described above, by performing the above control on the load installation 105, it is possible to decrease the supply of power to the load installation 105 without changing the control mode when the load of the power supply system 113 becomes large and to stably maintain the supply and demand balance of power in the power supply system 113.

[Photovoltaic Power Generating Facility]

As illustrated in FIG. 1, when the power generating facility using natural energy such as the photovoltaic power generating facility 109 is connected to the power supply system 113 separately from each facility 101X the power generated by the power generating facility may be adjusted according to the power supply and demand condition of the entire power supply system 113. For example, the fourth system control device 132 is in a state where the frequency of the power supply system 113 is equal to or greater than a preset fourth threshold value, and controls the power generated by the photovoltaic power generating facility 109 to decrease when the state where the frequency of the power supply system 113 is equal to or greater than the fourth threshold value continues for a predetermined time.

When the power generated by the photovoltaic power generating facility 109 increases, the power storage installation 103 temporarily charges a surplus. At this time, the frequency of the power supply system 113 increases due to the drooping characteristic of the virtual generator. Accordingly, the output of the power generating installation 104 decreases, so that the supply and demand balance is maintained. When the power generated by the photovoltaic power generating facility 109 further increases, the entire power generated by the power generating installation 104 reaches a lower limit value, and the state of charging of the power storage installation 103 continues. As a result, the SOC of the power storage device 5 increases and the active power command value $P_{ref}$ for the first power converter 6 is a value (positive value) on the discharge side, so that the frequency of the power supply system 113 continues to increase (which becomes the state greater than the fourth threshold value).

In such a case, the fourth system control device 132 which controls the photovoltaic power generating facility 109 determines that power supplied to the entire power supply system 113 is excessive when the frequency of the power supply system 113 continues to increase for a predetermined time, and limits or stops the power output from the photovoltaic power generating facility 109. Examples of the method of limiting the output power of the photovoltaic power generating facility 109 can include a method in which the fourth system control device 132 issues an instruction for decreasing an upper limit value of the output of the photovoltaic power generating facility 109 or stops generating power in some of a plurality of segments in a case of the photovoltaic power generating facility 109 constituted by the plurality of segments which can be controlled individually. Before limiting or stopping the output power of such a photovoltaic power generating facility 109, the first system control device 11 may reset the SOC command value of the power storage installation 103 to be a higher value.

Accordingly, when the power of the power supply system 113 is excessive, the supply of the power to the power supply system 113 can decrease without changing the control mode, and the supply and demand balance of the power in the power supply system 113 can be stably maintained.

[Overall System Operation]

Hereinafter, the overall operation of the combined power generation system 100 according to the present embodiment will be described.

(1) Steady State

There is no fluctuation of load in the load installation 105, fluctuation of the output power of the power generating installation 104, and fluctuation of generated power in the photovoltaic power generating facility 109, and furthermore, in the state where the SOC in power storage device 5 of the power storage installation 103 matches the SOC command value $SOC_{ref}$ of the power storage device 5, power is supplied from the power generating installation 104 and/or the photovoltaic power generating facility 109 of the corresponding facility 101X to the load installation 105. At this time, the power generating installation 104 supplies power to the load installation 105 in its own facility 101X and accommodates surplus power to other facilities. The output of the power storage installation 103 is zero, and the frequency of the power supply system 113 matches a reference frequency (rated frequency).

(2) When Load Increases

Consider a case where the load on the facility 101A increases from the steady state. As the load increases, the power supply system 113 generally suffers from a shortage of supply of the power generating installation 104. For this reason, the power storage installation 103 is provided to discharge due to the shortage. As a result, the frequency of the power supply system 113 decreases due to the drooping characteristic of the power storage installation 103. As the frequency of the power supply system 113 decreases, the power generating installation 104 of each facility 101X increases the generated power. Since the received power P is generated in the facility 101A (which becomes a positive value), the power generating installation 104 in the facility 101A increases the generated power so that the generated power becomes larger than the power generating installation 104 of other facilities. As the power generated by the power generating installation 104 of the facility 101A increases, the output of the power storage installation 103 decreases, and the frequency of the power supply system 113 also increases. Eventually, the output of the power storage installation 103 becomes zero, and the frequency of the power supply system 113 also returns to the reference frequency. However, since the power received by the facility 101A is a positive value, the power generated by the power generating installation 104 of the facility 101A continues to increase, so the frequency of the power supply system 113 also continues to increase. As a result, the power storage installation 103 is charged to absorb the generated power which has increased. As the frequency of the power supply system 113 increases, the power generated by the power generating installations 104 of other facilities decreases, and finally, only the power generating installation 104 of the facility 101A settles down in a state where the output increases.

(3) When Load Decreases

Consider a case where the load of the facility 101A decreases from the steady state. As the load decreases, the power supply system 113 generally suffers from an excessive supply of the power generating installation 104. Therefore, the power storage installation 103 is charged to absorb a surplus. As a result, the frequency of the power supply system 113 increases. As the frequency of the power supply system 113 increases, the power generating installations 104 of each facility 101X decrease the generated power. As the power generated by the power generating installation 104 decreases, the charge amount of the power storage installation 103 decreases, and the frequency of the power supply system 113 also decreases. When the charge amount of the power storage installation 103 becomes zero, the frequency of the power supply system 113 also returns to the reference frequency. However, since the received power P of other facilities is a positive value, the power generated by the power generating installations 104 of other facilities turns to increase, and thus the frequency of the power supply system 113 also increases again. Along with this, the power generated by the power generating installation 104 of the facility 101A decreases, and finally, only the power generating installation 104 of the facility 101A settles down in a state where the output decreases.

(4) When Generated Power of Power Generating Installation Reaches Upper Limit

In the above (2), it is assumed that the load of the facility 101A increases and the power generated by the power generating installation 104 of the facility 101A reaches the upper limit. Since the facility 101A receives power shortage from the power supply system 113, the frequency of the power supply system 113 decreases. As a result, the power generated by the power generating installations 104 of other facilities increases. Finally, the output of the power storage installation 103 of the facility 101A becomes zero, and settle down when the frequency of the power supply system 113 returns to the reference frequency. As a result, the facility 101A is maintained in the state of accommodating power from the power generating installations 104 of other facilities.

(5) When Generated Power of Photovoltaic Power Generating Facility Increases

When the power generated by the photovoltaic power generating facility 109 increases, the power supply system 113 is in the state of the surplus of supply, the frequency of the power supply system 113 increases, and the power storage installations 103 of each facility 101X charge the surplus. As the frequency of the power supply system 113 increases, the power generating installations 104 of each facility 101X decrease the generated power and decrease the power accommodated outside the facility. When the power generated by the photovoltaic power generating facility 109 further increases, the power generating installations 104 of each facility 101X continue to decrease the generated power and settle down in a state of receiving power from outside the facility.

(6) In Case where Entire Power Supply System Suffers from Shortage of Supply

It is assumed that the load of the power supply system 113 increases from the steady state and exceeds the supply capacity of the power generating installations 104 of each facility 101X. When the output of the power generating installations 104 of each facility 101X reaches the upper limit, the decrease in the frequency of the power supply system 113 from the reference frequency cannot be returned to the original state. Therefore, the shortage of power is supplied from the power storage installations 103 of each facility 101X to the power supply system 113. When this state continues, the SOC of the power storage device 5 is adjusted to the charge side, and the frequency of power supply system 113 further decreases. If the state where the frequency of the power supply system 113 is less than the predetermined value (the third threshold value described above) continues for a predetermined time, it is determined that the power supply system 113 is the shortage of supply, and the load installations 105 of each facility 101X are controlled to decrease or stop the load and to improve the shortage of supply.

(7) In Case where Entire Power Supply System Suffers from Surplus of Supply

A case is considered in which the power generated by the photovoltaic power generating facility 109 increases and is in an excessive state of supply in a state where the load of the entire power supply system 113 decreases. The power generating installations 104 of each facility 101X decrease the generated power, and when the generated power reach the lower limit, the surplus is charged to the power storage device 5 of the power storage installation 103. When the SOC of the power storage device 5 increases, the power storage installation 103 is adjusted to the discharge side, so the frequency of the power supply system 113 further increases. The frequency of the power supply system 113 is equal to or greater than the predetermined value (the fourth threshold value described above), and when the state where The frequency of the power supply system 113 is equal to or greater than the predetermined value continues for a predetermined time, it is determined that the power supply system 113 is the excessive supply, and the photovoltaic power generating facility 109 is controlled to perform the suppression or stop of the generated power and improve the excessive supply.

[Effect of Present Embodiment]

According to the combined power generation system 100 of the present embodiment in which a series of operations as described above are performed without switching the control mode, the following effects can be achieved.

(1) The power storage installation 103 and the power generating installation 104 distributed and arranged in the plurality of facilities 101X can be combined to configure a self-sustaining power supply system. As described above, in the present embodiment, the plurality of facilities 101X include, for example, ordinary homes, factories, buildings, commercial facilities, public facilities, and the like. In the combined power generation system 100, it is possible to combine and configure any number of facilities 101X different in type, capacity, configuration, and the like of installations inside each facility without limiting the number of facilities, the scale of each facility and the like. Conventionally, when attempting to configure such a self-sustaining power supply system, there is a restriction that a large-capacity power storage installation having a capacity capable of absorbing a fluctuation in load of the entire power supply system with one unit is required, or a motor generator is essential. However, in the above-described embodiment, since the plurality of power storage installations 103 and power generating installations 104 cooperate with each other to maintain the self-sustaining power supply system, the conventional restriction is removed.

(2) The voltage and frequency of the self-sustaining system can be properly maintained only by the power converter. The voltage and frequency of the self-sustaining system are maintained by the power storage installation 103 provided with the first power converter 6 under the virtual generator model control. The first power converter 6 in the present embodiment is controlled to simulate the drooping characteristic, the moment of inertia, and the impedance of the motor generator, so that good power supply quality can be maintained even in the first power converter 6 alone. When the self-sustaining system is configured by the conventional power converter, it was necessary to make one unit into the voltage control type power converter device, and to make the remainder units into the current control type power converter device. In this system, only the voltage control type power converter is capable of maintaining the voltage and frequency, and a large capacity voltage control type power converter is required to maintain the voltage and frequency. However, in the above embodiment, it is not necessary to make such different control modes coexist due to the cooperation of the plurality of power storage installations 103.

(3) The balance between the supply and demand of the self-sustaining system can be maintained properly. Although the fluctuation in load in the facility 101X in the combined power generation system 100 cause a temporary disturbance in the supply and demand balance between the power generated by the power generating installation 104 and the load power consumed by the load installation 105, this disturbance is absorbed by the power storage installation 103. Thereby, the disturbance of the power supply system 113 is suppressed with the fluctuation in the load. Moreover, at this time, since the power storage installation 103 is controlled by the first system control device 11 as the virtual generator having a predetermined drooping characteristic, it is possible to evenly distribute the sharing amount of power among the plurality of power storage installations 103.

(4) Power can be interchanged among the plurality of facilities 101X. In the combined power generation system 100 of the present embodiment, the power generating installation 104 can be efficiently operated by interchanging power between the facilities 101X. This eliminates the need for high-speed communication unit and a large number of measurers such as a power meter, as in a system that requires the centralized management of the operation of the power generating installation and the power storage installation like the conventional smart grid, and furthermore eliminates the complicated control.

(5) The power generating facility using natural energy such as the photovoltaic power generating facility 109 can be effectively used. In the power generating facility using natural energy such as sunlight or wind power, the amount of power generation changes depending on the amount of solar radiation or wind speed. Also, such power generating installations cannot follow load power. Therefore, it is premised that such a power generating facility operates in conjunction with the commercial system, and there is a problem that power cannot be supplied when the commercial system fails. According to the present embodiment, it is possible to effectively utilize the generated power by interchanging the surplus of the power generated by the power generating facility using such natural energy among the facilities 101X. Further, the disturbance of the power supply system 113 due to the output fluctuation can be suppressed.

(6) The degree of freedom in system configuration is high. In the combined power generation system 100 in the present embodiment, the control of the power storage installation 103, the power generating installation 104, the load installation 105, the photovoltaic power generating facility 109 and the like is configured independently in principle. In addition, there is no particular restriction on the configuration of each installation in the facility 101X and the capacity of each facility. Therefore, as described above, facilities 101C and 101D having either the power generating installation 104 or the power storage installation 103 or a facility 101E having only the load installation 105 may be present. Further, since information exchange between the facilities 101X is not performed, the addition or change of the facilities 101X is easy, and the degree of freedom of the system configuration is high. On the other hand, in the case of adding facilities in the conventional general smart grid, it is necessary to secure the communication unit between facilities and to change the program of the control device currently centrally managed, and it takes time and effort to change the installation configuration Other Application Example 1

All the facilities 101X included in the combined power generation system 100 of the present embodiment may be configured as a house, or facilities other than the house may be included. For example, in addition to a plurality of houses, the facility 101X may include public facilities that are used as a shelter at the time of the occurrence of disasters like a gymnasium may be included.

For example, public facilities may include emergency power generating installations such as photovoltaic power generating facilities and/or diesel power generating installations. These power generating installations are configured as relatively large capacity (for example, several hundred kW) power generating installations. In the case of such a configuration, in the conventional configuration, when the commercial power system is operating normally, the power generated by the photovoltaic power generating facility can be supplied to the load in the public facilities, and the surplus can be supplied (sold) to the commercial power system, but when the commercial system fails due to disasters or the like, the surplus cannot be processed, and it becomes necessary to stop the power generation in the photovoltaic power generating facility. Therefore, at the time of the power failure, the entire load in the public facilities will be covered by the power generated by the emergency power generating installation, and the power generation cannot be used regardless of even the case of the photovoltaic power generating facility. As a result, the emergency power generating installation needs to be always in operation during a power failure. At the time of the power failure such as a disaster, a situation may occur where the stored fuel required for power generation cannot be replenished due to the influence of the disaster or the like. In this case, the fuel may be exhausted and the emergency power generating installation may not operate.

On the other hand, in the combined power generation system 100 according to the present embodiment, at the time of the power failure of the commercial system 106, the self-sustaining power supply system can be constructed in public facilities and other facilities such as houses. According to the present embodiment, the voltage and frequency of the self-sustaining power supply system are maintained by the power storage installation provided in other facilities. On the other hand, the surplus of the power generated by the photovoltaic power generating facility in the public facility is accommodated to other facilities such as a house. In addition, the emergency power generating installation in the public facilities needs to be operated only when it is determined that the power supply capacity in the self-sustaining power supply system is insufficient, and the consumption of fuel for the emergency power generating installation is reduced as much as possible.

Furthermore, for example, when the disaster accompanied by the power failure occurs, and nearby residents are evacuated to the above public facilities as a shelter, they are used as a shelter by limiting power consumption of other facilities such as a house, thereby effectively performing the supply of power to the public facilities which are used as a shelter. In addition, in the case of a blackout such as planned blackout where the public facility is not used as a shelter, the load on the public facility is limited, and the power generated by the photovoltaic power generating facility of the public facility and the power generated by the emergency power generating installation can also be supplied to other facilities. Therefore, by configuring the combined power generation system 100 so that the public facilities are included in the system, it is possible to effectively use the power generating installations in the public facilities according to the situation of the power failure.

Another Application Example 2

In addition, the combined power generation system 100 according to the present embodiment is also applicable to remote islands and the like. On the remote island, the combined power generation system 100 is connected to a small-scale commercial system instead of a wide-scale commercial system 106. In the case of such a small-scale commercial system, there is a tendency that a fuel cost for power generation is high, and a power generation cost is high. For this reason, in such a case, there is a demand to introduce power generating facilities using natural energy such as solar light. However, in the conventional structure, the ability to adjust the supply and demand of small-scale commercial system is low, and when a large-scale power generating facility using natural energy is introduced, the voltage and frequency of a small scale commercial system will change due to the change in the power generated by the power generating facility, and there is thus a possibility that proper power quality cannot be maintained.

On the other hand, in the combined power generation system 100 according to the present embodiment, since the power storage installation 103 has the same drooping characteristic as that of the motor generator, the effect of reinforcing the supply and demand adjustment capability of small-scale commercial system can be obtained. In addition, since there are simulated inertia moments and internal impedance, the effect of enhancing the stability of small-scale commercial system can be obtained. In addition, since the power generating installation 104 such as a fuel cell installed in each facility adjusts the generated power by following the load power of its own, the effect of reducing the load variation caused by the entire power supply system 113 is expected. Furthermore, when the generated power is insufficient in the power supply system 113, the power can be accommodated to the small-scale commercial system. As a result, the supply and demand adjustment capability and the system stability of the small-scale commercial system such as the remote island are enhanced, and the introduction of the power generating installation using natural energy becomes easy. Furthermore, the small-scale commercial system does not need to run an excess power generating installation, and the power generation cost can thus be reduced.

[Simulation]

Hereinafter, a simulation shows that the combined power generation system according to the present invention can favorably distribute the load and interchange the power among a plurality of facilities. FIGS. 12A and 12B are graphs illustrating a simulation result according to an embodiment of the present invention. FIG. 12A is a graph illustrating a temporal change of each power value at each facility, and FIG. 12B is a graph illustrating a frequency change of the power supply system 113.

In the simulation, it is assumed that the power supply system 113 includes three facilities 101A, 101B, and 101C in FIG. 1. A photovoltaic power generating facility is not connected, and each facility has a power storage installation 103, a power generating installation 104, and a load installation 105. The power generating installation 104 is assumed to be a fuel cell power generating installation, and there are restrictions on the upper and lower limits and the rate of change of the generated power. As an initial state, each of the facilities 101A, 101B, and 101C has loads of 100 W, 200 W, and 300 W, which are charged by the fuel cell power generating installation 104 of each facility.

FIGS. 12A and 12B illustrate the simulation results when a load of 800 W is added to the load of the facility 101A in a step shape at a time of 100 seconds. In FIG. 12A, an increase in load is indicated by a solid line. After increasing the load at the facility 101A, a frequency decreases in the step shape as shown in FIG. 12B due to an operation of the power storage installation 103 as a virtual generator, but an increase in the output of the fuel cell power generating installation 104 indicated by a broken line in FIG. 12A is moderate due to the restriction of the rate of change of the output of the fuel cell power generating installation 104. In addition, in this case, an output of the power storage installation 103 indicated by a chain line in FIG. 12A is reduced (discharged) so that the power storage installations 103 of the three facilities 101A to 101C equally share the increase of the load at the beginning of the load increase.

As the frequency decreases, the output of the fuel cell power generating installation 104 gradually increases. Accordingly, a frequency of the power supply system 113 gradually rises, and the power shared by the power storage installation 103 decreases. In addition, to compensate for the increased load at facility 101A, since the facility 101A receives power from the facility 101B and the facility 101C, the received power increases as indicated by the dotted line in FIG. 12A. For this reason, the fuel cell power generating installation 104 of the facility 101A continuously increases the amount of power generation so as to reduce the received power. On the other hand, the fuel cell power generating installations 104 of the facility 101B and the facility 101C decrease the output to reduce the power being transmitted after the frequency of the power supply system 113 returns to its original value (the received power is the power transmission side). Ultimately, due to the limitation (700 W) of the output of the fuel cell power generating installation 104 of the facility 101A, the facility 101A is in a state of receiving the deficiency of 200 W for the 900 W that the initial load and the increased load are summed. In addition, the facility 101B and the facility 101C fall in a state where they share the deficiency of 200 W of the facility 101A for each 100 W.

In this way, according to the present invention, it is possible to implement a favorable load sharing independently only from the power received by each facility 101X and the frequency of the power supply system 113, without using information on what facility has changed for the change of the load of the facility. In the above-mentioned simulation, no compensation for SOC has been implemented, but in the present simulation, since the charge command for the power storage installation 103 of the facility 101A is greater than the charge command for the power storage installations 103 of the facility 101B and the facility 101C, a receiving power amount of the facility 101A increases more than the result of simulation, and eventually each SOC becomes balanced and reaches equilibrium.

Hereinabove, although the embodiment of the present invention has been described above, the present invention is not limited to the above embodiment, and various improvements, changes, and modifications can be made within the scope of the present invention.

For example, in the embodiment, the case where the power supply system to which the combined power generation system is applied is a three-phase system has been described, but the power supply system is not limited thereto. For example, even if the power supply system is a single-phase two-wire system or a single-phase three-wire system, it is possible to construct the same combined power generation system except that the various calculation methods differ according to the manner of the system.

INDUSTRIAL APPLICABILITY

The present invention is useful for appropriately perform load sharing of a power generating installation in a combined power generation system including a power conversion device capable of performing parallel operation in a self-sustaining state without changing a control mode in a case of switching from a self-sustaining operation to a linkage operation or from a linkage operation to a self-sustaining operation.

REFERENCE SIGNS LIST 3 current measurer
4 voltage measurer
5 power storage device
6 first power converter
11 first system control device
14 voltage/rotational speed/phase calculation unit (frequency calculator)
15 active and reactive power calculation unit (first measurer, second measurer)
40 first/second rotational speed command value calculation unit
44 first/third proportion calculator
47 first/third adder
50 first/second internal electromotive voltage command value calculation unit
54 second/fourth proportion calculator
57 second/fourth adder
59 proportional integral compensator
60 first/second internal phase difference angle calculation unit
70 first/second current command value calculation unit
84 first generated power change rate command value calculation unit
85 second generated power change rate command value calculation unit
86 second active power command value calculation unit
92 command value correction calculation unit
96 first active power command value calculation unit
100 combined power generation system
101X(X=A,B, . . . ) facility
102 inter-facility power distribution system
103 power storage installation
104 power generating installation
105 load installation
109 photovoltaic power generating facility (power generating facility using natural energy)
112 X(X=A,B, . . . ) intra-facility power distribution systems
113 power supply system
122 power generation device
124 second system control device
125 second power converter
131 third system control device
132 fourth system control device

The invention claimed is:

1. A combined power generation system configuring a power supply system where intra-facility power distribution systems respectively installed in a plurality of facilities are connected to each other to exchange power with each other via an inter-facility power distribution system, each of the intra-facility power distribution systems including at least one of a power storage installation which has a power storage device and a first power converter connected to the power storage device to convert direct current power of the power storage device into predetermined alternating current power, a power generating installation which has a power generation device performing output control, and a load installation which consume power, and the power supply system including at least one power storage installation, at least one power generation installation, and at least one load installation, the combined power generation system comprising:
a voltage measurer which measures a voltage of the power supply system;
a frequency calculator which calculates a frequency of the power supply system from the voltage of the power supply system;
a first system control device which controls the first power converter; and
a second system control device which controls the power generation device,
wherein
the intra-facility power distribution system including the power storage installation has a first measurer which measures a value for obtaining active power and reactive power at an output terminal of the first power converter,
the intra-facility power distribution system including the power generating installation has a received power measurer which measures received power supplied to the intra-facility power distribution system including the power generating installation,
the first system control device includes:
a first active power command value calculation unit which calculates a first active power command value permitting a negative value so as to reduce a deviation between a state of charge (SOC) of the power storage device and an SOC command value of the power storage device;
a first rotational speed command value calculation unit which calculates, for operating the power storage installation as a virtual generator, a first virtual rotational speed command value corresponding to a predetermined frequency droop characteristic and a predetermined inertia characteristic in the virtual generator from the first active power command value, active power obtained based on the value measured by the first measurer, and a reference rotational speed;
a first internal phase difference angle calculation unit which calculates a first virtual internal phase difference angle of the virtual generator by integrating a deviation between the first virtual rotational speed command value and a virtual rotational speed calculated based on the frequency calculated by the frequency calculator;
a first internal electromotive voltage command value calculation unit which calculates a first virtual internal electromotive voltage command value corresponding to the predetermined voltage droop characteristic in the virtual generator from a first reactive power command value, reactive power obtained based on the value measured by the first measurer and a reference voltage; and
a first current command value calculation unit which calculates a command value of an output current of the first power converter from the first virtual internal phase difference angle, the first virtual internal electromotive voltage command value, a voltage measured by the voltage measurer, and a predetermined internal impedance in the virtual generator, and the first system control device is configured to control the first power converter based on an output of the first current command value calculation unit,
the second system control device includes:
a first generated power change rate command value calculation unit which calculates a first generated power change rate command value from a deviation between the frequency calculated by the frequency calculator and a frequency command value;
a second generated power change rate command value calculation unit which calculates a second generated power change rate command value from the received power measured by the received power measurer; and
a second active power command value calculation unit which calculates a second active power command value by integrating a generated power change rate command value that is obtained by adding the first generated power change rate command value and the second generated power change rate command value, and
the second system control device is configured to control the power generation device based on an output of the second active power command value calculation unit,
the first generated power change rate command value calculation unit outputs the first generated power change rate command value for increasing an amount of power generation of the power generation device when the frequency is lower than the frequency command value, and outputs the first generated power change rate command value for decreasing an amount of power generation of the power generation device when the frequency is higher than the frequency command value, and
the second generated power change rate command value calculation unit outputs the second generated power change rate command value for increasing an amount of power generation of the power generation device when the received power is a value indicating that the corresponding intra-facility power distribution system receives power and outputs the second generated power change rate command value for maintaining an amount of power generation of the power generation device when the received power is a value indicating that the corresponding intra-facility power distribution system transmits power.

2. The combined power generation system according to claim 1, wherein the second active power command value calculation unit calculates the second active power command value so as to increase a degree of influence of the first generated power change rate command value on the second active power command value with respect to the second generated power change rate command value.

3. The combined power generation system according to claim 1, wherein the first internal electromotive voltage command value calculation unit includes a second proportion calculator which proportionally calculates a deviation between the first reactive power command value and the reactive power obtained based on the value measured by the first measurer, and a second adder which adds a reference voltage to an output of the second proportion calculator to calculate the first virtual internal electromotive voltage command value.

4. The combined power generation system according to claim 1, wherein the power generating installation includes the power generation device and a second power converter connected to the power generation device to convert power of the power generation device into predetermined alternating current power, and the second system control device includes a second current command value calculation unit which calculates a command value of an output current of the second power converter based on the second active power command value and is configured to control the second power converter based on an output of the second current command value calculation unit.

5. The combined power generation system according to claim 1, wherein
the power generation device is a fuel cell, and
the second power converter is configured to convert direct current power of the fuel cell into alternating current power.

6. The combined power generation system according to claim 1, wherein the power generation device is a power generation device using a generator driven by a motor and is configured so that the generator is directly incorporated into the intra-facility power distribution system synchronously, and a driving force of the motor driving the generator is controlled so that an output of the generator follows the second active power command value.

7. The combined power generation system according to claim 1, wherein the second system control device controls the power generating installation to start power generation when the frequency calculated by the frequency calculator becomes less than a preset first threshold value and a state where the frequency is less than the first threshold value is continued for a predetermined time, and the second system control device controls the power generating installation to stop power generation when the frequency becomes equal to or greater than a preset second threshold value as a value equal to or greater than the first threshold value and a state where the frequency is equal to or greater than the second threshold value is continued for a predetermined time.

8. The combined power generation system according to claim 1, comprising a third system control device which controls the load installation, wherein
the third system control device controls power consumed by the load installation to decrease when the frequency calculated by the frequency calculator is less than a preset third threshold value and a state where the frequency is less than the third threshold value is continued for a predetermined time.

9. The combined power generation system according to claim 1, comprising:
a power generating facility using natural energy and being connected to the power supply system; and
a fourth system control device which controls the power generating facility using natural energy, wherein
the fourth system control device controls to decrease power generated by the power generating facility using natural energy when the frequency calculated by the frequency calculator becomes equal to or greater than a preset fourth threshold value and a state where the frequency is equal to or greater than the fourth threshold value is continued for a predetermined time.

10. The combined power generation system according to claim 1, wherein the second system control device includes a command value correction calculation unit which corrects the second active power command value based on a value obtained by accumulating the received power.

\* \* \* \* \*